(12) United States Patent
Uchikawa et al.

(10) Patent No.: US 8,167,781 B2
(45) Date of Patent: May 1, 2012

(54) MULTI-SPINDLE HEAD EXCHANGEABLE MACHINE TOOL

(75) Inventors: Motoki Uchikawa, Tochigi (JP); Tomoyoshi Miyagi, Tochigi (JP); Norifumi Hirao, Tochigi (JP); Kaname Goto, Tochigi (JP); Takayuki Motojima, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 1143 days.

(21) Appl. No.: 11/910,487

(22) PCT Filed: Apr. 10, 2006

(86) PCT No.: PCT/JP2006/307559
§ 371 (c)(1),
(2), (4) Date: Oct. 2, 2007

(87) PCT Pub. No.: WO2006/112290
PCT Pub. Date: Oct. 26, 2006

(65) Prior Publication Data
US 2009/0080988 A1    Mar. 26, 2009

(30) Foreign Application Priority Data

Apr. 13, 2005  (JP) .................................. 2005-115816
Apr. 13, 2005  (JP) .................................. 2005-115833
Apr. 13, 2005  (JP) .................................. 2005-115884

(51) Int. Cl.
B23Q 3/157    (2006.01)
(52) U.S. Cl. ................ 483/32; 483/52; 483/51; 483/60; 483/56; 483/66

(58) Field of Classification Search ............. 483/32, 483/36, 38, 44, 46, 49, 51, 52, 54–56, 60–62, 483/66, 53
See application file for complete search history.

(56) References Cited

U.S. PATENT DOCUMENTS

| 4,216,572 A | * | 8/1980 | Matsushita et al. | 483/32 |
| 4,354,306 A | * | 10/1982 | Ida et al. | 483/32 |
| 4,510,669 A | * | 4/1985 | Ida et al. | 483/32 |
| 4,776,081 A | * | 10/1988 | Okunishi et al. | 483/9 |

FOREIGN PATENT DOCUMENTS

| JP | 57-205011 | 12/1982 |
| JP | 60-118457 | 6/1985 |
| JP | 63-68336 | 3/1988 |
| JP | 63-102810 | 5/1988 |
| JP | 63-114807 | 5/1988 |
| JP | 63-295106 | 12/1988 |
| JP | 10-34477 | 2/1998 |
| JP | 10-100752 | 4/1998 |
| JP | 10-272015 | 10/1998 |

* cited by examiner

*Primary Examiner* — Erica E Cadugan
(74) *Attorney, Agent, or Firm* — Rankin, Hill & Clark LLP

(57) ABSTRACT

A multi-spindle head exchangeable machine tool is provided with a plurality of multi spindle heads movably mounted on an annular rail. When a workpiece is machined by driving a rotary tool by a machining unit, multi spindle heads of the plurality of multi spindle heads being out of use can be separated from the machining unit. Further, a connecting device is provided with an inner slider, ball bearings fitted to an outer periphery of the inner slider, an outer slider, and a coil spring to press the outer slider toward a stopper member.

8 Claims, 19 Drawing Sheets

Related Art

MULTI-SPINDLE HEAD EXCHANGEABLE MACHINE TOOL

TECHNICAL FIELD

The present invention relates to a multi-spindle head exchangeable machine tool.

BACKGROUND ART

There is known a conventional multi-spindle head exchangeable machine tool provided with a plurality of gang heads (multi spindle heads), in which the plurality of gang heads are connected with a index table and moved on an annular rail (for example, refer JP-A-63-114807). In the multi-spindle head exchangeable machine tool, an input shaft of one of the gang heads with rotary tools is detachably mounted to an output shaft of a machining unit.

As shown in FIG. 2 of JP-A-63-114807, in the multi spindle machine tool 30, gang heads 42a to 42d serving as multi spindle heads are movably mounted on upper and lower annular rails 40a and 40b. The gang heads 42a to 42d are engaged to an index table 44 disposed above the annular rail 40a. When a rotary driving source 46 rotates the index table 44, the gang heads 42a to 42d rotates. Thus, one of the gang heads 42a to 42d faces a workpiece W loaded on a jig 90, by moving the gang heads 42a to 42d used for machining the workpiece W, in turns.

In the multi spindle machine tool 30, four gang heads 42a to 42d are moved on the annular rails 40a and 40b at the same time. Therefore, for example, in the state that one gang head 42a is in use, if the other gang heads 42b to 42d are detached from the annular rails 40a and 40b so as to perform a tooling change, the tooling change should be completed before the gang head 42a finishes its operation. Otherwise, the index table 44 is automatically rotated after the gang head 42a finishes its operation, so that the next gang head 42b moves to the position of the gang head 42a. Thus, it is difficult to detach the gang heads 42b to 42d, which are relatively heavy, in such a too short time for the tooling change. Further, if the index table 44 is stopped from rotating in order to perform the tooling change of the gang heads 42b to 42d, an operating ratio of the multi spindle machine tool 30 decreases.

Therefore, for performing the tooling change of the gang heads 42b to 42d, the gang heads 42b to 42d may be detached from the machining unit 34 by moving the annular rails 40a and 40b themselves. However, in this case, the gang heads 42b to 42d should be locked on the annular rails 40a and 40b while moving the annular rails 40a and 40b.

In addition, the gang heads 42a to 42d are provided with a plurality of tools, so that they are heavy. Here, the weight of the gang heads 42a to 42d becomes larger as the number of the gang heads 42a to 42d increases. Therefore, when the heavy gang heads 42a to 42d are rotated at a predetermined angle, the rotation speed of the index table 44 should be lowered. As the rotation speed becomes lowered, the time taken to machine the workpiece W in the gang heads 42a to 42d increases, so that a yield is deteriorated.

Further, as shown in FIG. 4 of JP-A-63-114807, the multi spindle machine tool has a connection structure in which the gang head 42a including a plurality of rotary tools 76a to 76c is connected with a machining unit 34 provided in a main body 56.

The gang head 42a includes serration shafts 86a and 86b as input shafts for obtaining a driving power used to drive the rotary tools 76a to 76c. The machining unit 34 includes rotary shafts 64a and 64c as output shafts for outputting the driving power of a driving motor 58. The main body 56 moves along with a slide table 48 by a cylinder 52, so that the serration shafts 86a and 86b are connected to or separated from holes having groove 70a and 70c of the rotary shafts 64a and 64c.

In the multi-spindle machine tool, the serration shafts 86a and 86b and the groove attaching holes 70a and 70c are formed with male serrations and female serrations, respectively. If the male serration and the female serration are not engaged with each other, the serration shafts 86a and 86b cannot be engaged with the groove attaching holes 70a and 70c. Disclosed in FIG. 19 is an improved connection structure as related art of the present invention (it is not prior art of the present invention).

FIG. 19 is a cross-sectional view showing the connection structure between an input shaft and an output shaft according to the related art of the present invention (it is not prior art). A connecting device 202, which is provided in a driving source so as to be connected to the input shaft 201 of the tool, includes an opening 204 formed in a housing 203 accommodating the driving source, a slider 207 movable between the output shafts of the driving source within the opening 204, and a spring 208 interposed between the slider 207 and each output shaft 206 to press the slider 207 toward the input shaft 201.

The slider 207 includes a female-spline 212 to be spline-combined with a male-spline 211 formed in an outer periphery of the output shaft 206, a sliding-surface formed in an inner periphery thereof to slide on a sliding-surface 213 formed in the outer periphery of the output shaft 206, an end portion 217 to be in contact with a stopper 216 extending upwardly from the sliding-surface 213 of the output shaft 206, and a female-spline 222 to be spline-combined with a male-spline 221 provided in an end portion of the input shaft 201.

In the case where the connecting device 202 is moved toward the input shaft 201 and the slider 207 is spline-combined with the input shaft 201 in the state that the input shaft 201 is spaced apart from the slider 207, if the male-spline 221 of the input shaft 201 is not engaged with the female-spline 222 of the slider 207, the slider 207 moves back into the opening 204 by the movement of the connecting device 202 while being resistant to the elasticity of the spring 208 in the state that the end portions of the input shaft 201 and the slider 207 are in contact with each other. Thus, an excessive force is not applied to the input shaft 201 and the output shaft 206.

In the above-mentioned connecting device 202, the spring 208 is provided in the output shaft 206 and thus rotates along with the output shaft 206. As a rotational speed of the output shaft 206 increases, the spring 208 vibrates in the opening 204, thereby making it difficult to achieve the high speed rotation of the output shaft 206. Further, it is difficult to achieve the high speed rotation of the tool.

If the male-spline 221 and the female-spline 222 are engaged and spline-combined with each other while the slider 207 goes back in the state that the male-spline 221 and the female-spline 222 are not engaged with each other, the slider 207 rapidly moves toward the input shaft 206 by the elasticity of the spring 208. Therefore, the end portion 217 of the slider 207 collides with the stopper 216 of the output shaft 206. At this time, the collision is transferred to the inside of the driving source via the output shaft 206, and may have an effect on the operation of the driving source.

DISCLOSURE OF THE INVENTION

One or more embodiments of the present invention provide a multi-spindle head exchangeable machine tool which can perform maintenance such as a tooling change of some multi spindle heads even though another multi spindle heads are in use, and improve an operating ratio thereof; and also provide a moving lock device which can prevent the multi spindle head from moving on a rail supporting the multi spindle head.

In addition, one or more embodiments of the present invention provide a multi-spindle head exchangeable machine tool for improving a manufacturing performance.

Moreover, one or more embodiments of the present invention provide a multi-spindle head exchangeable machine tool in which a tool can be rotated at high speed and it has no effect on operation of the driving source, thereby operating the driving source smoothly.

In accordance with one or more embodiments of the present invention, a multi-spindle head exchangeable machine tool is provided with: a main body; an annular rail surrounding the main body; a plurality of multi spindle heads movably mounted on the annular rail; and a machining unit that is connected to or separated from one of the multi spindle heads and drives tools provided in the multi spindle heads. When the machining unit drives the tools to machine a workpiece, spindle heads of the plurality of multi spindle heads being out of use are detachable from the machining unit. Further, the main body includes a first main body including the machining unit, and a second main body being movable against the first main body by a driving source provided in the first main body. Furthermore, the annular rail includes a first stationary rail mounted to the first main body and a second stationary rail mounted to the second main body, which are dividable from each other.

The second main body is moved relative to the first main body having the machining unit, so that the first stationary rail and the second stationary rail are separated from each other. The tools of the multi spindle heads provided in the first stationary rail of the first main body are driven by the machining unit to machine the workpiece. Further, the multi spindle heads, which are out of use, are separately moved to the second stationary rail of the second main body, so that maintenance such as the tooling change or the like can be applied to the multi spindle heads of the second stationary rail.

In addition, in accordance with one or more embodiments of the present invention, the second main body may include a multi-spindle head locking unit, which is disposed in vicinity of the second stationary rail and locks rollers of a suspension mechanism for suspending the multi spindle heads movably. Further, the multi-spindle head locking unit is operated to lock the movement of the multi spindle heads when the first main body and the second main body are moved relative to each other.

When the first stationary rail and the second stationary rail are moved relative to each other as the second main body is moved against the first main body, the rollers of the suspension mechanism are locked by the multi-spindle head locking unit in order to prevent the multi spindle heads suspended on the second stationary rail from the movement.

Further, in accordance with one or more embodiments of the present invention, a movement locking device for a traveling body that is suspended by a movable rail and moves along the rail locks rollers of a suspension mechanism to suspend the traveling body. The movement locking device locks the rollers of the suspension mechanism, when the rail moves, so that the traveling body suspended on the rail is not moved on the rail.

In the multi-spindle head exchangeable machine tool of one or more embodiments of the present invention, the multi spindle heads being in use are remained in the first stationary rail, and the other spindle heads are moved to the second stationary rail. Therefore, a maintenance such as the tooling change or the like can be applied to the multi spindle heads suspended on the second stationary rail regardless of the use of the multi spindle heads suspended on the first stationary rail. As a result, the multi spindle heads can be exchanged without stopping the whole equipment, and the operating ratio is improved, so that a machining performance is improved.

In addition, in the multi-spindle head exchangeable machine tool of one or more embodiments of the present invention, the locking means for the multi spindle heads locks the movement of the multi spindle heads while the second stationary rail moves, thereby stopping the multi spindle heads at a predetermined position.

In addition, in the multi-spindle head exchangeable machine tool of one or more embodiments of the present invention, the movement locking device locks the rollers of the suspension mechanism, and prevents the traveling body from movement, thereby stopping the traveling body at a predetermined position.

Moreover, in accordance with one or more embodiments of the present invention, a multi-spindle head exchangeable machine tool is provided with: a main body having an index driving source; an annular rail surrounding the main body; a plurality of multi spindle heads movably mounted to the annular rail and coupled to an index table driven by the index driving source; and a machining unit detachably coupled to the multi spindle heads so as to drive a plurality of tools provided in one of the multiple spindle heads. Here, the main body includes a first main body, a second main body being movable relative to the first main body by a driving source provided in the first main body. Further, the annular rail includes a first stationary rail mounted to the first main body, a second stationary rail mounted to the second main body, and a third stationary rail detachably mounted to the machining unit. Also, a plurality of locking members is provided in the index table and coupled to and spaced from each of the multi spindle heads. The index table is rotatably mounted on the top of the first main body. A locking member operating means includes a cam device to make some of locking members be coupled to or separated from the multi spindle heads at the same time. Some multi spindle heads are remained on the first and third stationary rails by separating the first and third stationary rails from the second stationary rail, and one of the multi spindle heads is moved to a machining position by the index table.

The first main body and the second main body are moved relative to each other, and the first stationary rail and the second stationary rail are separated from each other, so that the plurality of multi spindle heads are divided into the multi spindle heads placed in the first stationary rail and the multi spindle heads placed in the second stationary rail. For example, the multi spindle heads in the first stationary rail are driven by the machining unit.

The number of multi spindle heads in the first stationary rail is reduced, so that the weight thereof is also decreased. When the multi spindle heads are coupled to the index table and driven by the index driving source, the multi spindle heads in the first stationary rail can move fast.

In addition, in accordance with one or more embodiments of the present invention, a first cam member may be provided inside the annular rail of the first main body. The first cam member has one end movably mounted to a supporting shaft and the other end formed with a first cam groove. An extending and opening member is provided with a movable rail in the outside thereof. A bracket member is provided around the center of the first main body. A substantially triangular link plate has one vertex to be movably mounted to the bracket member, and the other two vertexes coupled with first and second shaft members, wherein the first shaft member is movably inserted in the first cam groove of the extending and opening member. A substantially L-shaped second cam groove is formed inside the annular rail of the second main body, and includes a straight groove extending in a relative moving direction of the first and second main bodies, and a curved groove curved toward the center of the second main body and moving from the straight groove to the bracket member. Further, in a second cam member, the second shaft member is movably inserted in the second cam groove. When the first main body and the second main body are moved close to each other and the first stationary rail and the second stationary rail are connected with each other, the second shaft member is placed inside the straight groove of the second cam member, so that the movable rail is placed inside the first main body. On the other hand, when the first main body and the second main body are moved apart from each other and the first stationary rail and the second stationary rail are separated from each other, the second shaft member is moved to the inside off the curved groove of the second cam member, so that the first shaft member swings outward with respect to the bracket member and swings outward to extend and opened with respect to the supporting shaft. Thus, the movable rail moves along an extension line of the first stationary rail.

When the first main body and the second main body move close to each other and the first and second stationary rails are connected with each other, the second shaft member of the link plate is placed inside the straight groove of the second cam member and the first shaft member of the link plate is placed inside the first cam groove of the first cam member. Further, the movable rail provided outside the extending and opening member including the first cam member is placed inside the first main body.

When he first main body and the second main body move relative to each other and the second shaft member of the link plate moves in the straight groove of the second cam member, the second shaft member of the link plate stops on the first main body because the straight groove extends in a relative moving direction of the first main body and the second main body, and the extending and opening member connected to the link plate through the first shaft member also does not swing because the link plate does not swing against the bracket member.

When the first main body and the second main body are moved relative to each other and the first and second stationary rails are moved apart from each other, and the second shaft member of the link plate is moved inside the curved groove curved toward the center of the second main body so as to move from the straight groove to the bracket member, the first shaft member of the link plate swings toward the outside of the second main body with respect to the bracket member because the second shaft member moves toward the center of the second main body. Therefore, the first cam member connected to the first shaft member swings toward the outside of the second main body with respect to the supporting shaft, and the extending and opening member including this cam member swings outward to extend and opened, so that a movable arm moves outward and is connected to the first stationary rail as extending from the first stationary rail.

In addition, in accordance with one or more embodiments of the present invention, the extending and opening member may be provided inside the annular rail of the first main body. The extending and opening member has one end movably mounted to the supporting shaft and at the same time has a movable rail in the outside thereof. When the first main body and the second main body are moved close to each other and the first stationary rail and the second stationary rail are connected, the movable rail is accommodated in the first main body. On the other hand, when the first main body and the second main body are relatively moved and separated from each other, the movable rail moves to the extension line of the first stationary rail. The movement of the movable rail is implemented by swing the extending and opening member based on the relative movement between the first main body and the second main body due to the driving source.

The driving source relatively moves the first main body and the second main body, and the extending and opening member is rotated by this relative movement. Thus, the movable rail placed outside the extending and opening member is moved from the state of being accommodated in the first main body to the extension line of the first stationary rail.

In the multi-spindle head exchangeable machine tool of one or more embodiment of the present invention, the annular rail includes the first stationary rail mounted to the first main body, the second stationary rail mounted to the second main body, and the third stationary rail mounted to the machining unit, which are detachably connected with each other. The plurality of locking members is provided in the index table and coupled to and spaced from each of the multi spindle heads. The index table is rotatably mounted on the top of the first main body. Further, the locking member operating means includes a cam device to make some of locking members be coupled to or separated from the multi spindle heads at the same time. Therefore, when the first main body and the second main body are relatively moved and the first stationary rail is separated from the second stationary rail, some multi spindle heads are remained on the first stationary rail and the third stationary rail and the total weight of the multi spindle head decreases, thereby enhancing the moving speed of the multi spindle heads. Thus, it is possible to reduce the time taken in setting the multi spindle heads at predetermined positions, and to reduce the cycle time, thereby improving productivity.

In addition, in the multi-spindle head exchangeable machine tool of one or more embodiment of the present invention, even though the first stationary rail and the second stationary rail are separated from each other, a movable range of the multi spindle head in the first stationary rail can be secured because the movable rail is provided on the extension line of the first stationary rail.

In addition, in the multi-spindle head exchangeable machine tool of one or more embodiment of the present invention, the movable rail is moved by the relative movement between the first main body and the second main body, so that there is not needed a separate power source for moving the movable rail. That is, the driving source provided in the first main body is enough to move the movable rail, so that it is possible to achieve a simple and lightweight device.

Moreover, in accordance with one or more embodiments of the present invention, a multi-spindle head exchangeable machine tool is provided with: a main body having a rotary driving source for driving a rotary tool; multi spindle heads that can be coupled to and separated from the main body and have the rotary tool; an output shaft provided in the rotary driving source, an input shaft transferring a dynamic force to the rotary tool; and a connecting device for connecting the output shaft and the input shaft. Here, the connecting device includes an inner slider having one end spline-combined with the input shaft, a middle part spline-combined with a large caliber part provided in the output shaft, and the other end sliding on a small caliber part having a smaller diameter than the large caliber part in a shaft direction of the output shaft;

bearings fitted in the outer periphery of the inner slider; an outer slider fitted in the outer periphery of the bearings and sliding in the shaft direction of the output shaft on the inner periphery of the opening formed in the main body to accommodate the output shaft; and an elastic member interposed between the outer slider and one end of the opening so as to press the outer slider toward the other end of the opening installed in the input shaft.

The elastic member is installed in a non-rotated portion between the outer slider and the end of the opening so as to press the outer slider toward the input shaft. The elastic member is provided separately from the output shaft, thereby achieving the high speed rotation of the output shaft.

Further, the output shaft and the inner slider are fitted to each other, and the bearings are fitted to the outer periphery of the inner slider. The outer slider is fitted to the outer periphery of the bearings, and the outer slider is fitted to the output shaft through the inner slider and the bearing.

If the splines of the input shaft and the inner slider are not engaged when the main body is moved close to the multi spine head and the end portion of the inner slider contacts the end portion of the input shaft in order to make one end of the inner slider be spline-combined with the input shaft, the inner slider, the bearings and the outer slider are resistant to the pressure of the elastic member and go back within the opening in a direction opposite to the moving direction of the main body.

At this time, if the splines of the input shaft and the inner slider are engaged, the compressed spring is expanded and the inner slider, the bearings and the outer slider are moved toward the input shaft by the elasticity of the elastic member, so that the outer slider collides with one end of the opening. The impact of this collision is absorbed in the bearings installed between the outer slider and the inner slider, so that little impact is transferred to the output shaft.

In the multi-spindle head exchangeable machine tool of one or more embodiments of the present invention, the connecting device includes an inner slider having one end spline-combined with the input shaft, a middle part spline-combined with a large caliber part provided in the output shaft, and the other end sliding on a small caliber part having a smaller diameter than the large caliber part in a shaft direction of the output shaft; bearings fitted in the outer periphery of the inner slider; an outer slider fitted in the outer periphery of the bearings and sliding in the shaft direction of the output shaft on the inner periphery of the opening formed in the main body to accommodate the output shaft; and an elastic member interposed between the outer slider and one end of the opening so as to press the outer slider toward the other end of the opening installed in the input shaft. Thus, the elastic member is installed between the outer slider and the other end of the opening, i.e., the elastic member is placed in the main body having no effect on the rotation of the output shaft, so that there is no limitation in the rotational speed of the output shaft due to the conventional elastic member installed in the rotary shaft. Therefore, the rotary tools of the multi spindle heads can be rotated at high speed, and the workpiece can be machined under a high speed cutting condition, thereby enhancing productivity.

Further, the bearings interposed between the inner slider and the outer slider can buffer the impact generated when the input shaft and the inner slider are spline-combined with each other. Therefore, the operation of the driving source is not effected by the impact, and there is not needed a specific rotary driving source being highly resistant to the impact. Thus, it is possible to use a marketing standard motor, thereby decreasing a production cost.

Other aspects and advantages of the invention will be apparent from the following description and the appended claims.

REFERENCE NUMERALS

10: MULTI-SPINDLE HEAD EXCHANGEABLE MACHINE TOOL
11: FIRST STATIONARY RAIL
12: SECOND STATIONARY RAIL
13: ANNULAR RAIL
21 to 26: MULTI SPINDLE HEAD
28: INDEX TABLE
31: INDEX DRIVING SOURCE (ROTARY DRIVING SOURCE)
33: MOVABLE RAIL
35: MACHINING UNIT
36 to 38: TOOL (ROTARY TOOL)
43: THIRD STATIONARY RAIL
61: MAIN BODY
65: FIRST MAIN BODY
66: SECOND MAIN BODY
71: DRIVING SOURCE (ROTARY DRIVING SOURCE)
78, 79, 106 to 109: LOCKING MEMBER
111: CAM DEVICE
115: LOCKING MEMBER OPERATING UNIT
155: SUPPORTING SHAFT
156: FIRST CAM MEMBER
156a: FIRST CAM GROOVE
157: EXTENDING AND OPENING MEMBER
158: BRACKET MEMBER
163: FIRST SHAFT MEMBER
164: SECOND SHAFT MEMBER
166: LINK PLATE
166a, 166b, 166c: VERTEX
167: SECOND CAM MEMBER
167a: SECOND CAM GROOVE
167b: STRAIGHT GROOVE
167c: CURVED GROOVE
87: INNER SLIDER
88: BEARING (BALL BEARING)
92: OPENING
93: OUTER SLIDER
94: ONE END OF OPENING (STOPPER)
96: INPUT SHAFT
97: ELASTIC MEMBER (COIL SPRING)
121: LARGE CALIBER PART
122: SMALL CALIBER PART
255: OUTPUT SHAFT
256: CONNECTING DEVICE

BEST MODE FOR CARRYING OUT THE INVENTION

Exemplary embodiments of the invention will be described with reference to the accompanying drawings.

Figure 1:
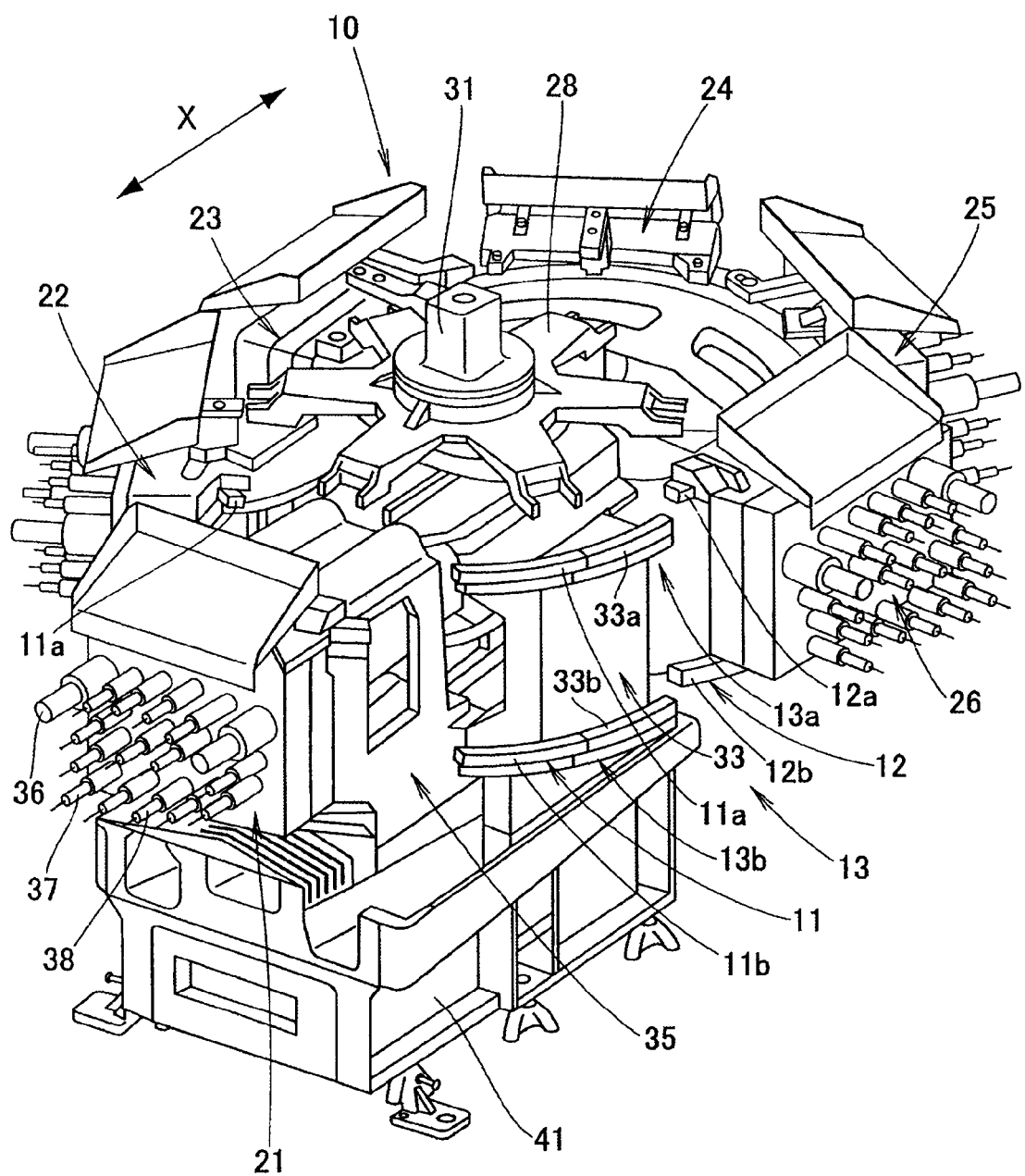
FIG. 1 is a perspective view of a multi-spindle head exchangeable machine tool according to an exemplary embodiment of the invention.

It is preferable that the drawings be seen on the basis of a direction of reference numerals. FIG. 1 is a perspective view of a multi-spindle head exchangeable machine tool according to an exemplary embodiment of the invention. In the multi-spindle head exchangeable machine tool 10, a plurality of multi spindle heads (so-called "gang head") 21 to 26 is movably mounted to an annular rail 13, which can be divided into a first stationary rail 11 and a second stationary rail 12 in an X-axis direction. The first stationary rail 11 includes an upper first stationary rail 11a and a lower first stationary rail 11b placed under the upper first stationary rail 11a, and the second stationary rail 12 includes an upper second stationary rail 12a and a lower second stationary rail 12b placed under the upper second stationary rail 12a. Further, the annular rail 13 includes an upper annular rail 13a and a lower annular rail 13b placed under annular rail 13a. When the first stationary rail 11 and the second stationary rail 12 are connected with each other, an index table 28 provided in the upper center of the annular rail 13 is rotated by a rotary driving source 31, so that the multi spindle heads 21 to 26 are moved along the annular rail 13. When the first stationary rail 11 and the second stationary rail 12 are separated from each other, the multi spindle heads (e.g., 21 and 22) provided on the first stationary rail 11 are moved on the first stationary rail 11 and a movable rail 33 (including an upper movable rail 33a and a lower movable rail 33b placed under the upper movable rail 33a (to be described in detail below)) connectable to the first stationary rail 11. Further, one (e.g., 21) of the multi spindle heads 21 and 22 is connected to a machining unit 35, and a driving source (not shown) mounted in the machining unit 35 drives a plurality of rotary tools (for convenience, reference numerals 36 to 38 are given to some rotary tools) provided in the multi spindle head 21, thereby machining a workpiece loaded in a jig (not shown).

Figure 2:
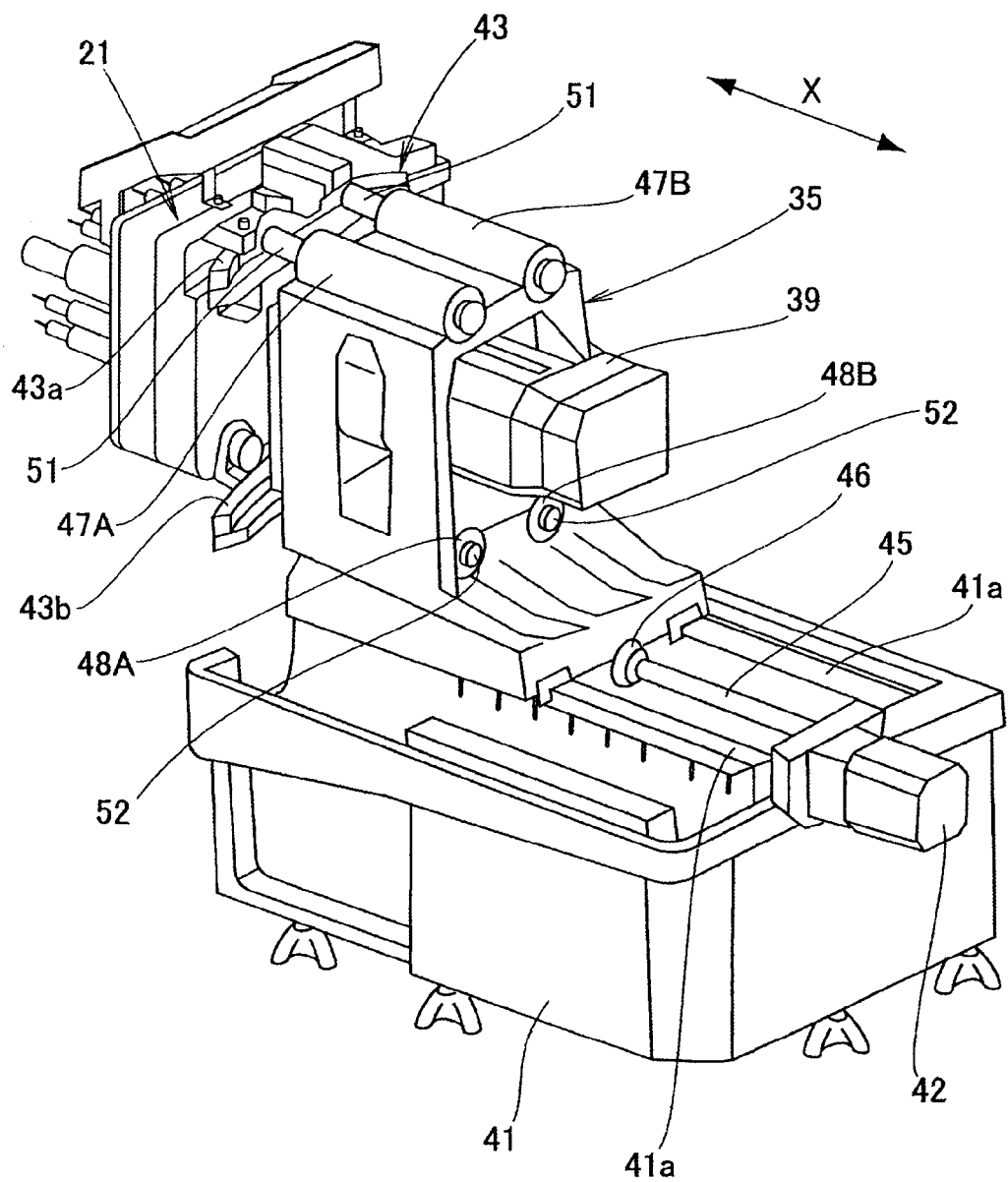
FIG. 2 is a perspective view of a machining unit according to the exemplary embodiment of the invention.

FIG. 2 is a perspective view of the machining unit according to the exemplary embodiment of the invention. The machining unit 35 is provided with a driving source 39 for driving the rotary tools, and is movably mounted onto rails 41a and 41a, which are seated on a base 41 and extend in the X-axis direction. Here, the rotary driving source 42 provided on the rear side of the base 41 rotates a ball screw 45, so that the machining unit 35 having a nut member 46 screw-engaged with the ball screw 45 is moved in the X-axis direction.

Further, the machining unit 35 includes a pair of upper left and right cylinders 47A and 47B and a pair of lower left and right cylinders 48A and 48B in order to support a third stationary rail 43, which is connected to the first rail 11 (refer to FIG. 1) and constitutes a part of the annular rail 13.

The third stationary rail 43 includes an upper third stationary rail 43a and a lower third stationary rail 43b placed under the upper third stationary rail 43a. The upper third stationary rail 43a is mounted to the ends of rods 51 provided in the upper cylinders 47A and 47B. Further, the lower third stationary rail 43b is mounted to the ends of rods 52 provided in the lower cylinders 48A and 48B.

Figure 3:
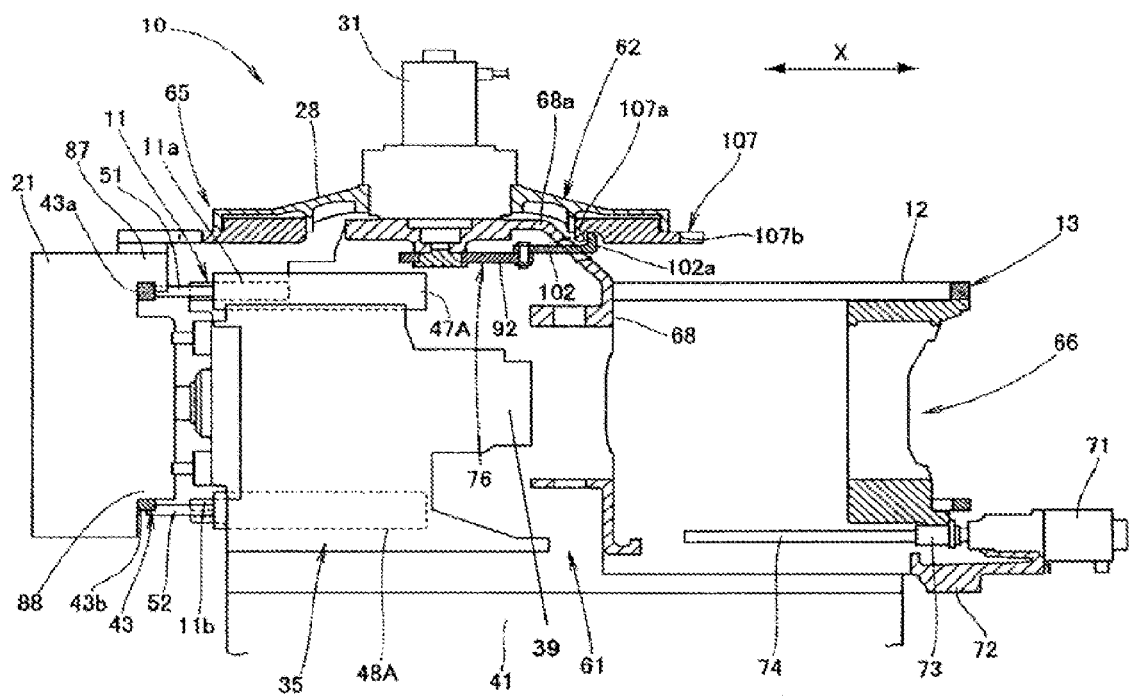
FIG. 3 is a cross-sectional view of the multi-spindle head exchangeable machine tool according to the exemplary embodiment of the invention.

FIG. 3 is a cross-sectional view of the multi-spindle head exchangeable machine tool according to the exemplary embodiment of the invention. The multi-spindle head exchangeable machine tool 10 includes the base 41, the main body 61 mounted on the base 41, the annular rail 13 provided to the main body 61, the multi spindle heads 21 to 26 (only 21 is shown by way of example) movably mounted to the annular rail 13, an index unit 62 that is disposed on the upper side of the main body 61 to move the multi spindle heads 21 to 26, and the above-mentioned machining unit 35.

The main body 61 includes a first main body 65 disposed on the side of the jig for loading the workpiece therein (i.e., on the left side in FIG. 3), and a second main body 66 movably mounted to the base 41. The first main body 65 includes the first stationary rail 11, a hut-shaped housing 68 that accommodates the machining unit 35 therein and is provided with the index unit 62 thereon, and a driving source supporter 72 for supporting the rotary driving source 71. The first main body 65 is fixed to the base 41.

The second main body 66 includes the second stationary rail 12 mounted thereon, and a nut member 73 mounted on the bottom thereof. The nut member 73 is screw-engaged with the ball screw 74 connected to the rotary driving source 71 of the first main body 65. Accordingly, when the rotary driving source 71 is operated to rotate the ball screw 74, the second main body 66 is moved from the first main body 65 in the X-axis direction by the nut member 73.

The index unit 62 includes the rotary driving source 31 mounted to the ceiling 68a of the housing 68, the index table 28 that is rotatably mounted to the ceiling 68a through a shaft (not shown) and is rotated by the rotary driving source 31, and a holder 76 to fix the index table 28 to the multi spindle heads 21 to 26. The holder 76 will be described in more detail below.

The machining unit 35 includes a driving force transmission mechanism 81, which transmits a driving force from the output shaft thereof to the input shaft of one multi spindle head (for example, the multi spindle head 21) of the multi spindle heads 21 to 26 facing the workpiece. The driving force transmission mechanism 81 achieves the high speed rotation of the rotary tool, and has no effect on the driving source 39 when the output shaft and the input shaft are connected to each other, so that the marketing standard motor can be used as the driving source 39.

Figure 4:
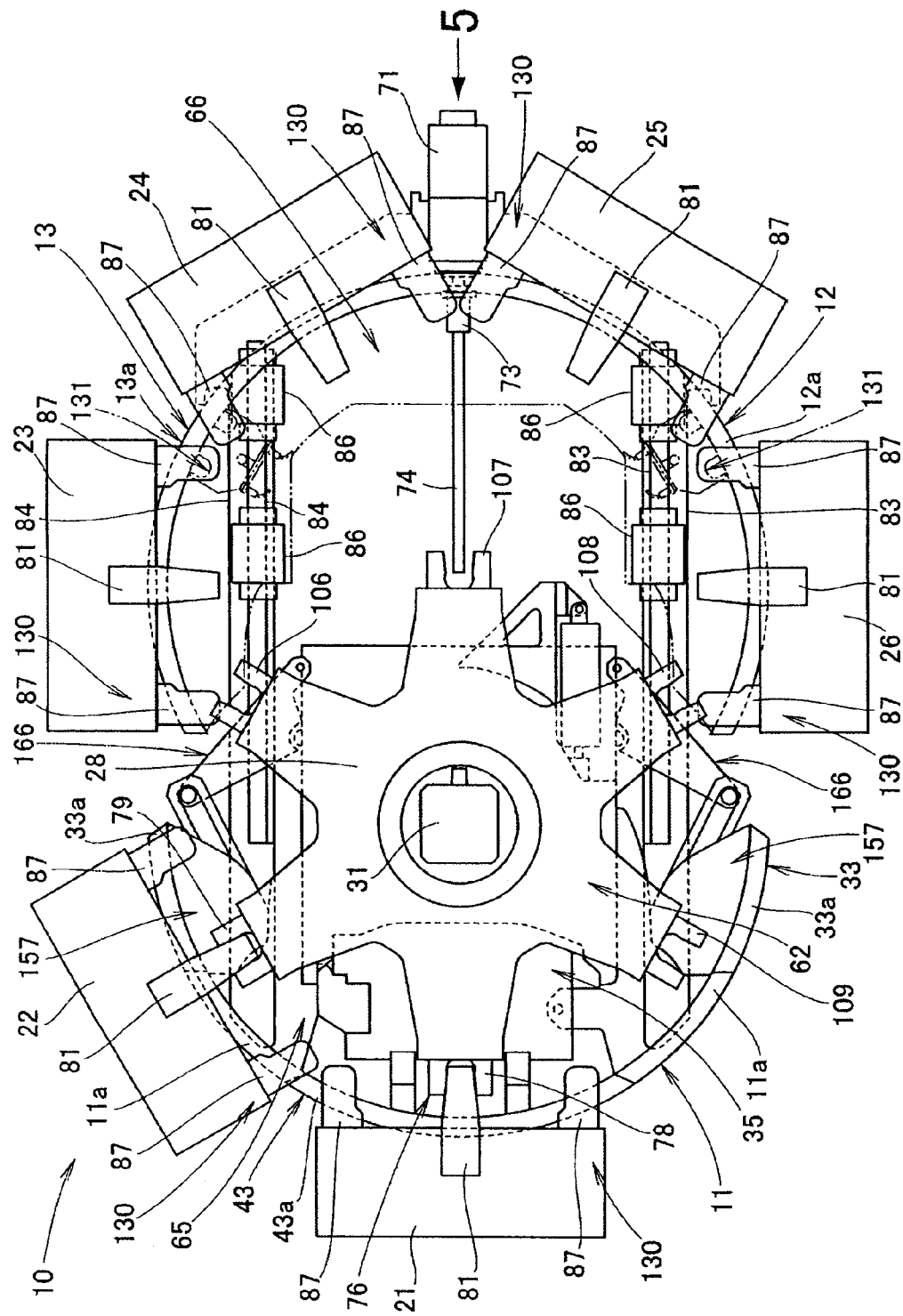
FIG. 4 is a plan view of the multi-spindle head exchangeable machine tool according to the exemplary embodiment of the invention.

FIG. 4 is a plan view of the multi-spindle head exchangeable machine tool according to the exemplary embodiment of the invention. FIG. 4 shows a state where the second main body 66 is moved in a direction to be separated from the first main body 65, and the first stationary rail 11 of the first main body 65 is separated from the second stationary rail 12 of the second main body 66. In FIG. 4, the rotary tools of the multi spindle heads 21 to 26 are omitted (the following description is the same).

In the first main body 65, the multi spindle heads 21 and 22 remain in the first stationary rail 11 and the third stationary rail 43 respectively, and each objective held piece 81 mounted in the upper center of the multi spindle heads 21 and 22 is fixed by a holder 76 of the index unit 62. Here, the multi spindle heads 21 and 26 are positioned at a predetermined position, and the multi spindle head 21 is positioned at a machining position. The holder 76 includes locking members 78 and 79 that hold objective held pieces 81 of the multi spindle heads 21 and 22, respectively.

Further, in the second main body 66, the multi spindle heads 23 and 26 are settled in a predetermined position of the second stationary rail 12. Meanwhile, reference numerals 83 and 84 indicate a pair of rails, and are used to move the second main body 66 thereon.

In the drawing, the reference numerals 87, 87, 88, 88 (only the reference numerals 87 and 87 are shown herein, but the reference numeral of 88 was shown in FIG. 3) indicate arms for suspending the multi spindle heads 21 to 26 on the annular rail 13 and the movable rail 33, respectively (The arms 87 and 87 are mounted on the upper annular rail 13a and the upper movable rail 33a, and the arms 88 and 88 are mounted on the lower annular rail 13b and the lower movable rail 33b.

Figure 5:
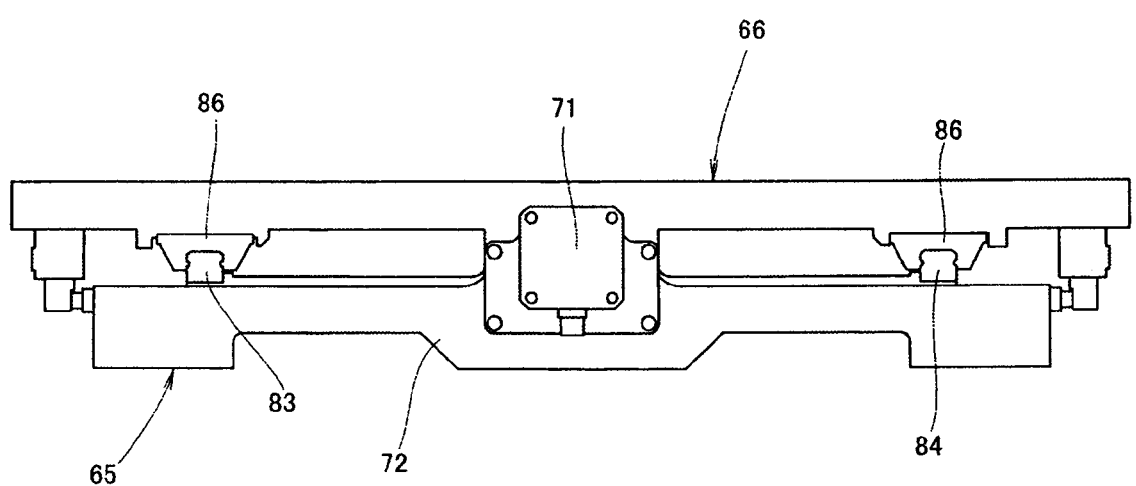
FIG. 5 is a view as seen in a direction indicated by an arrow 5 of FIG. 4.

FIG. 5 is a view as seen in a direction indicated by an arrow 5 of FIG. 4. The rotary driving source 71 is mounted to the driving source supporter 72 of the first main body 65, and sliding members 86 are movably fitted to the rails 83 and 84 mounted to the first main body 65. The second main body 66 is mounted to sliding members 86 and 86.

Figure 6:
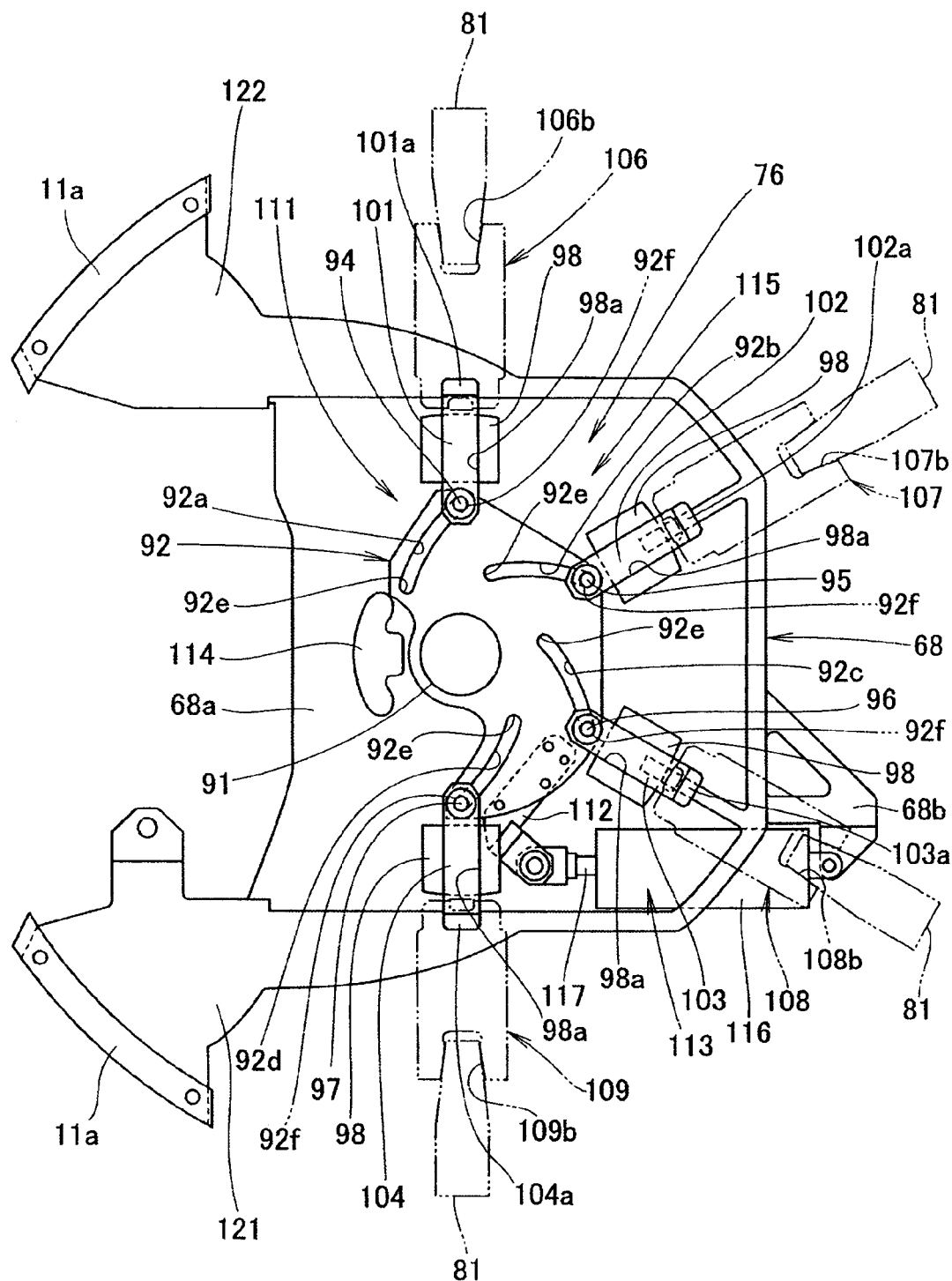
FIG. 6 is a plan view of a holder according to the exemplary embodiment of the invention.

FIG. 6 is a plan view of a holder according to the exemplary embodiment of the invention. The holder 76 includes a shaft member 91, a locking cam member 92, pins 94 to 97, rod members 101 to 104, locking members 106 to 109, a cam driving cylinder 113, and a stopper member 114. The shaft member 91 is mounted to the center of the ceiling 68a (refer to FIG. 3) of the housing 68. The locking cam member 92 has a polygonal shape, and is rotatably supported by the shaft member 91. The pins 94 to 97 are provided in arc-shaped cam grooves 92a to 92d that are formed to approach vertexes of the locking cam member 92, respectively. One ends of the rod members 101 to 104 are connected to the pins 94 to 97 and movably inserted in grooves 98a, respectively, which are formed in convex parts 98 protruding from the housing 68. One ends of the locking members 106 to 109 are connected to hooks 101a to 104a, respectively, which are formed at the other ends of the rod members 101 to 104. The other ends of the locking members 106 to 109 are provided with locking notches 106b to 109b, which are fixed to the objective held pieces 81 of the multi spindle heads 21 to 26 (refer to FIG. 1). One end of the cam driving cylinder 113 is movably mounted to the bracket 68b provided on an outer wall of the housing 68 in order to generate the driving force for rotating the locking cam member 92. The other end of the cam driving cylinder 113 is mounted to the locking cam member 92 by a mounting bracket 112. The stopper member 114 restricts the rotation of the locking cam member 92.

Each of the cam grooves 92a to 92d has one end 92e close to the shaft member 91, and the other end 92f (facing the pins 94 to 97 in this drawing) further distant from the shaft member 91 than the one end 92e.

The above-mentioned locking cam member 92 and the pins 94 to 97 form a cam device 111, and the holder 76 except the locking members 106 to 109 forms the locking member operating mechanism 115.

Returning to FIG. 3, the locking members 106 to 109 include hooks 106a to 109a (the hook 107a is exemplarily shown) to be hooked to the hooks 101a to 104a (only the hook 102a is shown) of the rod members 101 to 104 (only the rod member 102 is shown). Further, the locking members 106 to 109 are movably mounted to the bottom of the index table 28.

In FIG. 6, the cam driving cylinder 113 includes a cylinder part 116, and a rod member 117 coming in and out of the cylinder part 116 by the hydraulic pressure of the cylinder part 116. Here, reference numerals 121 and 122 indicate arms that extend from the housing 68 to support the pair of upper first stationary rails 11a and 11a. Meanwhile, the arms supporting the pair of left and right lower first stationary rails 11b and 11b are not shown.

Figure 7:
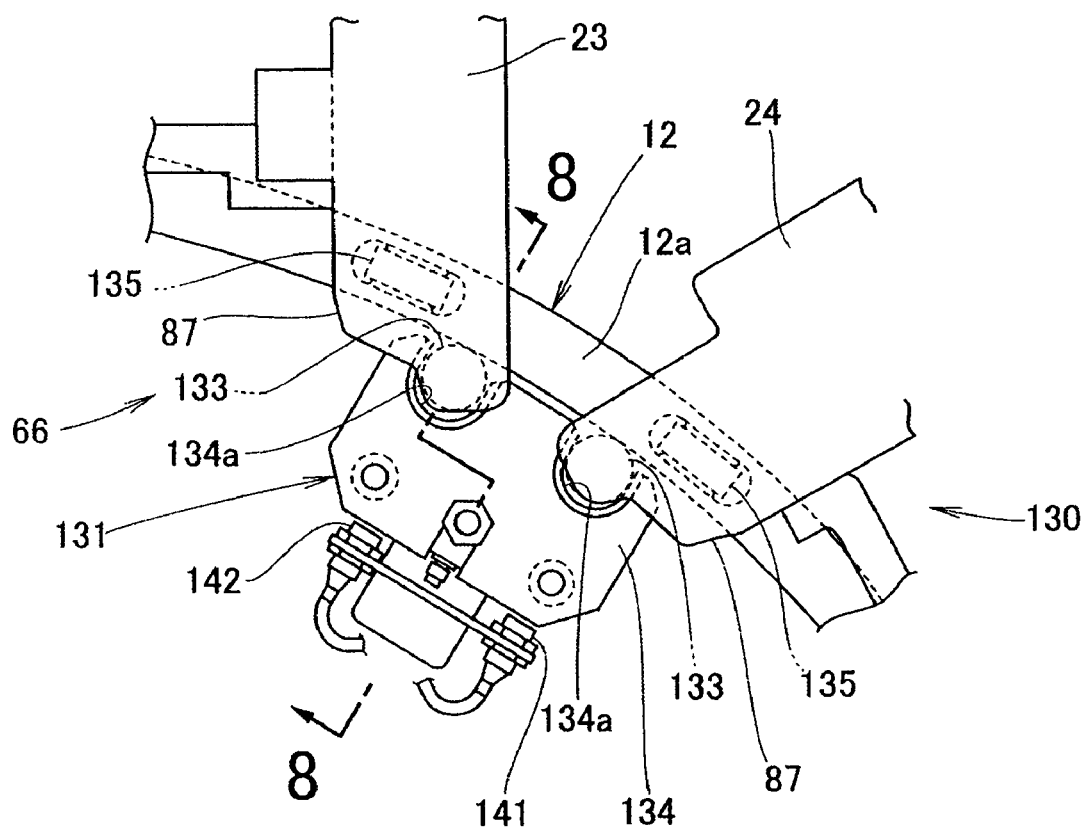
FIG. 7 is a schematic plan view of main parts of a second main body according to the exemplary embodiment of the invention.

FIG. 7 is a plan view showing main parts of a second main body according to the exemplary embodiment of the invention. The second main body 66 is provided with a movement locking device 131 for locking the movement of the adjacent multi spindle heads 23 and 24 on the second stationary rail 12.

The movement locking device 131 includes a lock plate 134 having engaging recesses 134a and 134a to be engaged with inner side roller members 133 mounted in the arms 87, 87, 88 and 88 (only reference numeral 87 is shown) of the multi spindle heads 23 and 24.

Each of the inner side roller members 133 rolls on the inner peripheries of the upper second stationary rail 12a and the lower second stationary rail 12b (refer to FIG. 1), so that the multi spindle heads 23 and 24 are movably mounted to the second stationary rail 12. Further, the inner side roller members 133 are also provided at the ends of another multi spindle heads 21, 22, 25 and 26 (refer to FIG. 4).

In the drawing, reference numeral 135 indicates an upper roller member mounted to the arms 87, 87, 88 and 88, and each of the upper roller members rolls on top surface of the upper and lower second stationary rails 12a and 12b, so that the multi spindle heads 23 and 24 are movably mounted to the second stationary rail 12. The upper roller members 135 are also provided at the ends of another multi spindle heads 21, 22, 24 and 26.

Further, each of the multi spindle heads 21 to 26 includes outer side roller members (not shown) that roll on the outer peripheries of the upper second stationary rail 12a and the lower second stationary rail 12b, so that the multi spindle heads 23 and 24 are movably mounted to the second stationary rail 12.

The inner side roller members 133, the upper roller members 135, the outer side roller members and the arms 87, 87, 88 and 88 form a suspension mechanism 130 that movably suspends the multi spindle heads 21 to 26 on the annular rail 13. The suspension mechanism 130 is proved to each of the multi spindle heads 21 to 26.

As described above, if the movement locking device 131 is provided, when the multi spindle heads 23, 24, 25 and 26 (refer to FIG. 1) are not fixed by the index unit 62, the multi spindle heads 23, 24, 25 and 26 are prevented from moving on the second stationary rail 12. Thus, the movement locking device 131 can stop the multi spindle heads 23, 24, 25 and 26 at a predetermined position.

Figure 8A:
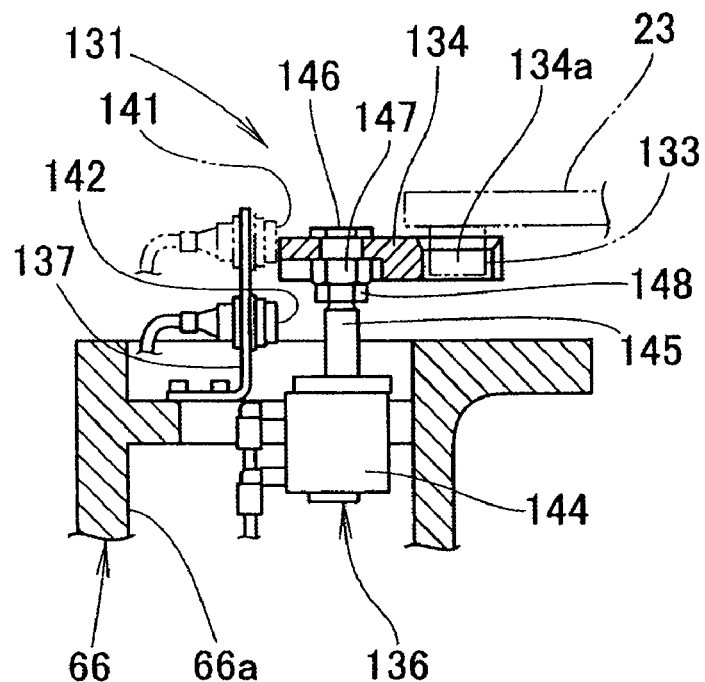
FIG. 8A illustrates a movement locking device according to the exemplary embodiment of the invention, in a state where a lock plate positioned in an upper end.
Figure 8B:
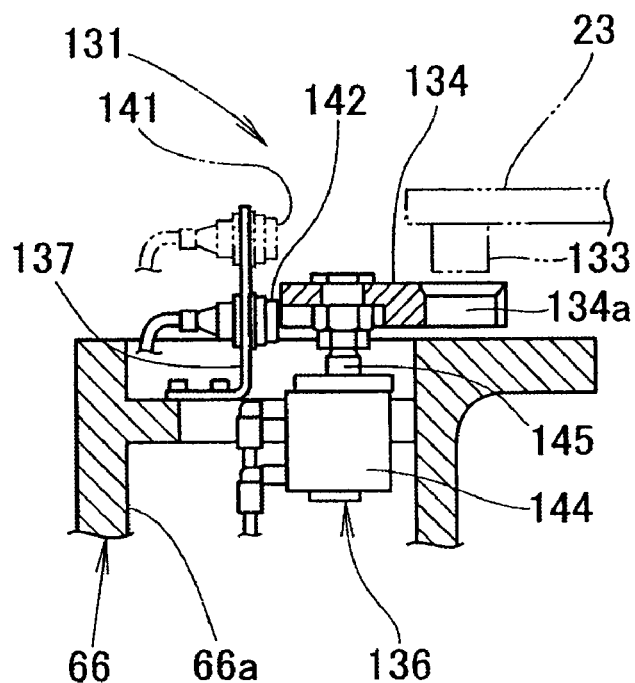
FIG. 8B illustrates the movement locking device according to the exemplary embodiment of the invention, in a state where a lock plate positioned in a lower end.

FIGS. 8A and 8B illustrate the movement locking device according to the exemplary embodiment of the invention, and correspond to the cross-sectional views taken along line 8-8 of FIG. 7. In FIG. 8A, the movement locking device 131 includes the lock plate 134, a cylinder 136 that is mounted to a frame 66a of the second main body 66 so as to move the lock plate 134 up and down, position detecting sensors 141 and 142 that are mounted to the frame 66a by an L-shaped bracket 137 so as to sense upper and lower limits of the lock plate 134, and a guide rod (not shown) for guiding the movement of the lock plate 134.

The cylinder unit 136 includes a cylinder 144, and a rod member 145 coming in and out of the cylinder 144 by the hydraulic pressure supplied to the cylinder 144. The lock plate 134 is mounted to the end of the rod member 145 by nut members 146 to 148.

In the FIG. 8A, the lock plate 134 is positioned at the upper limit, and the engaging recesses 134a and 134a (only one reference numeral 134a is shown) are engaged with the inner side roller members 133 and 133 (only one reference numeral 133 is shown).

Referring to FIG. 8B, the cylinder 136 is operated to move the lock plate 134 down, and is positioned at the lower limit. Therefore, the movement locking device 131 releases the locking state of the inner side roller members 133 and 133 (only one reference numeral 133 is shown).

Figure 9:
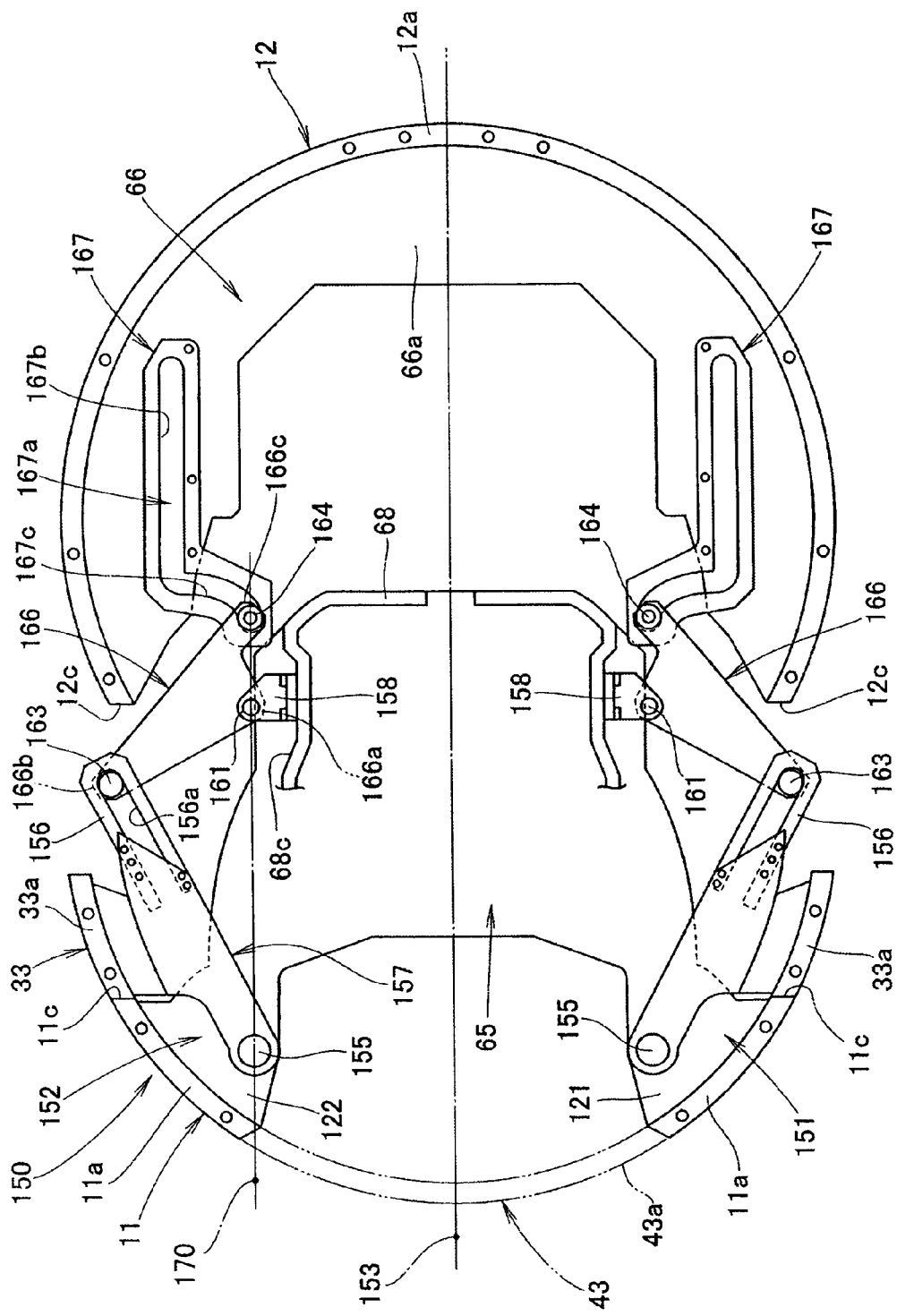
FIG. 9 is a plan view of a movable rail driving unit for driving a movable rail according to the exemplary embodiment of the invention.

FIG. 9 is a plan view of a movable rail driving unit for driving a movable rail according to the exemplary embodiment of the invention. The movable rail driving unit 150 for driving the movable rail 33 includes a pair of left and right driving units 151 and 152, which are mounted to the housing 68. The left and right driving units 151 and 152 are symmetric with respect to a centerline 153, and have the same structure. Therefore, only the right driving unit 152 will be described below.

The right driving unit 152 includes a supporting shaft 155 mounted to the arm 122 of the housing 68; an extending and opening member 157 that has one end swingably mounted to the supporting shaft 155 and the other end mounted to a U-shaped first cam member 156, and is provided with the movable rail 33 (for example, the upper movable rail 33a and the lower movable rail 33b (refer to FIG. 1)) on the outside thereof; a bracket member 158 mounted to a side wall 68c of the housing 68; a substantially triangular link plate 166 in which the supporting shaft 161 mounted to the bracket member 158 is swingably mounted around one vertex 166a, and the first and second shaft members 163 and 164 are mounted around the other two vertexes 166b and 166c, respectively, and the first shaft member 163 is movably inserted into the first cam groove 156a formed in the cam member 156 of the extending and opening member 157; and a substantially L-shaped second cam member 167 which is mounted to the frame 66a of the second main body 66 and has a second cam groove 167a, and in which the second shaft member 164 of the link plate 166 is movably inserted into the second cam groove 167a. As shown in FIG. 9, the second cam groove 167a has a substantially L-shape similar to the shape of the second cam member 167.

The upper movable rail 33a has an arc shape and is disposed on the extension line of the upper first stationary rail 11a, thereby forming a part of a circle together with the upper first stationary rail 11a. The lower movable rail 33b has an arc shape and is disposed on the extension line of the lower first stationary rail 11b, thereby forming a part of a circle together with the lower first stationary rail 11b. The first cam groove 156a of the cam member 156 is formed in a direction of the other end of the extending and opening member 157 as seen from the supporting shaft 155, i.e., is straightly formed in a centrifugal direction. Here, the extending member 157 and the link plate 166 form the first main body 65.

The second cam groove 167a of the second cam member 167 includes a straight groove 167b extending in parallel with the centerline 153, and a curved groove 167c curved from one end of the straight groove 167b toward the centerline 153 to approach the bracket member 158. When the second shaft member 164 is moved to the end of the curved groove 167c, the upper and lower movable rails 33a and 33b are moved on the extension lines of the upper and lower first stationary rails 11a and 11b, respectively.

A straight line 170, which passes through the axial center of the supporting shaft 155 of the first main body 65 and the axial center of the supporting shaft 161 of the bracket member 158, is parallel with the centerline 153. In the drawing, the axial center of the second shaft member 164 is disposed on the straight line 170.

In the drawing, reference numerals 11c and 11c indicate the cross-sections of the upper first stationary rail 11a and the lower first stationary rail 11b, respectively. Reference numerals 12c and 12c indicate the cross-sections of the upper second stationary rail 12a and the lower second stationary rail 12b, respectively, which have the arc shapes. When the second main body 66 moves to the first main body 65, the cross-sections 11c and 11c come in contact with the cross-sections 12c and 12c, respectively.

Figure 10:
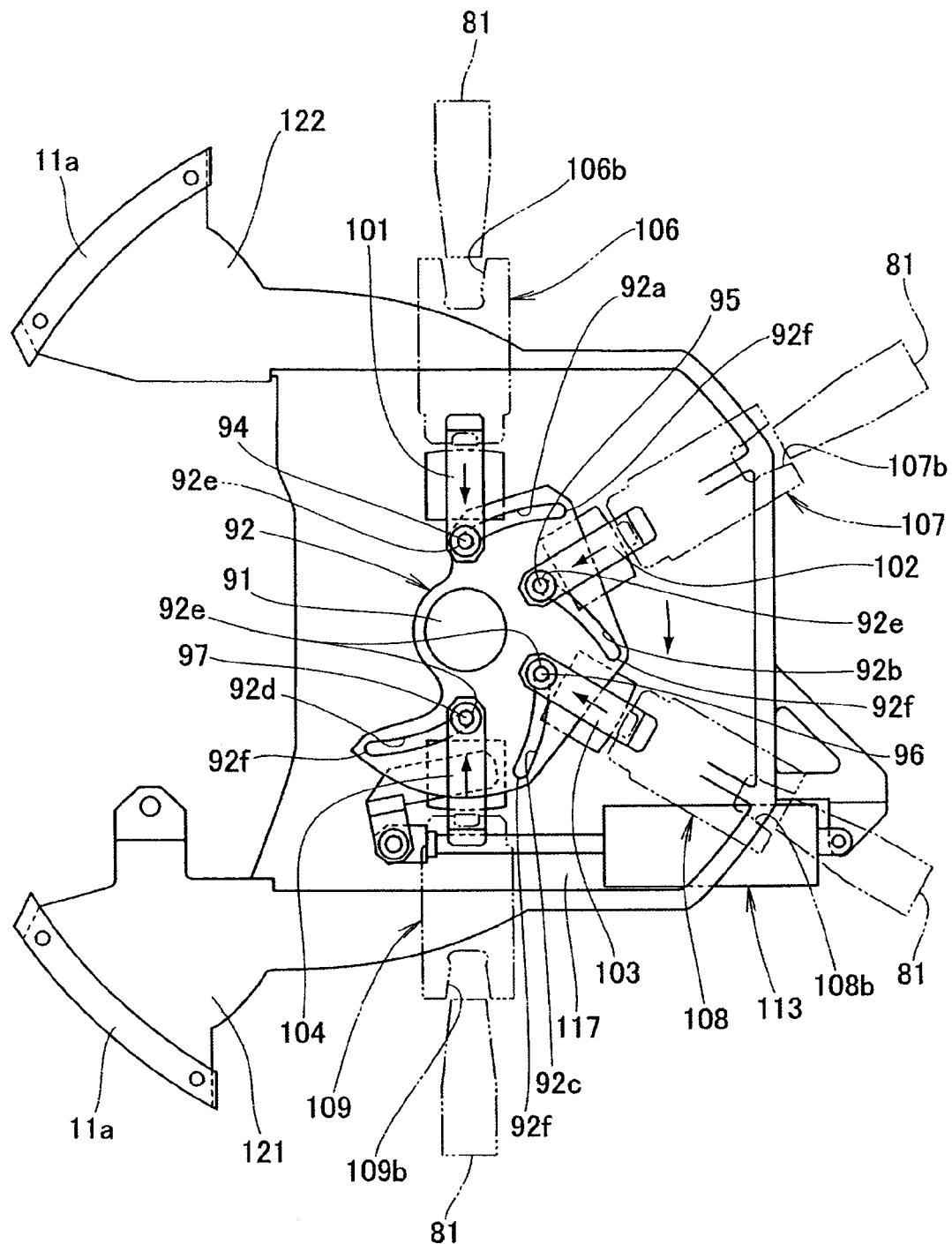
FIG. 10 illustrates the operation of a holder according to the exemplary embodiment of the invention.

Next, the operation of each component of the above-mentioned multi-spindle head exchangeable machine tool 10 will be described. FIG. 10 illustrates the operation of the holder according to the exemplary embodiment of the invention. As shown in FIG. 10 from the state of FIG. 6, when the cam driving cylinder 113 operates to extend the rod member 117, the locking cam member 92 is rotated clockwise with respect to the shaft member 91, and the pins 94 to 97 inserted into the cam grooves 92a to 92d are moved from the other ends to one ends of the cam grooves 92a to 92d. Therefore, the rod members 101 to 104 are moved to approach the shaft member 91 according to the movement of the pins 94 to 97. Further, the locking members 106 to 109 connected to the rod members 101 to 104 deviate from the objective held pieces 81 of the multi spindle heads 23 to 26 (refer to FIG. 4).

Figure 11:
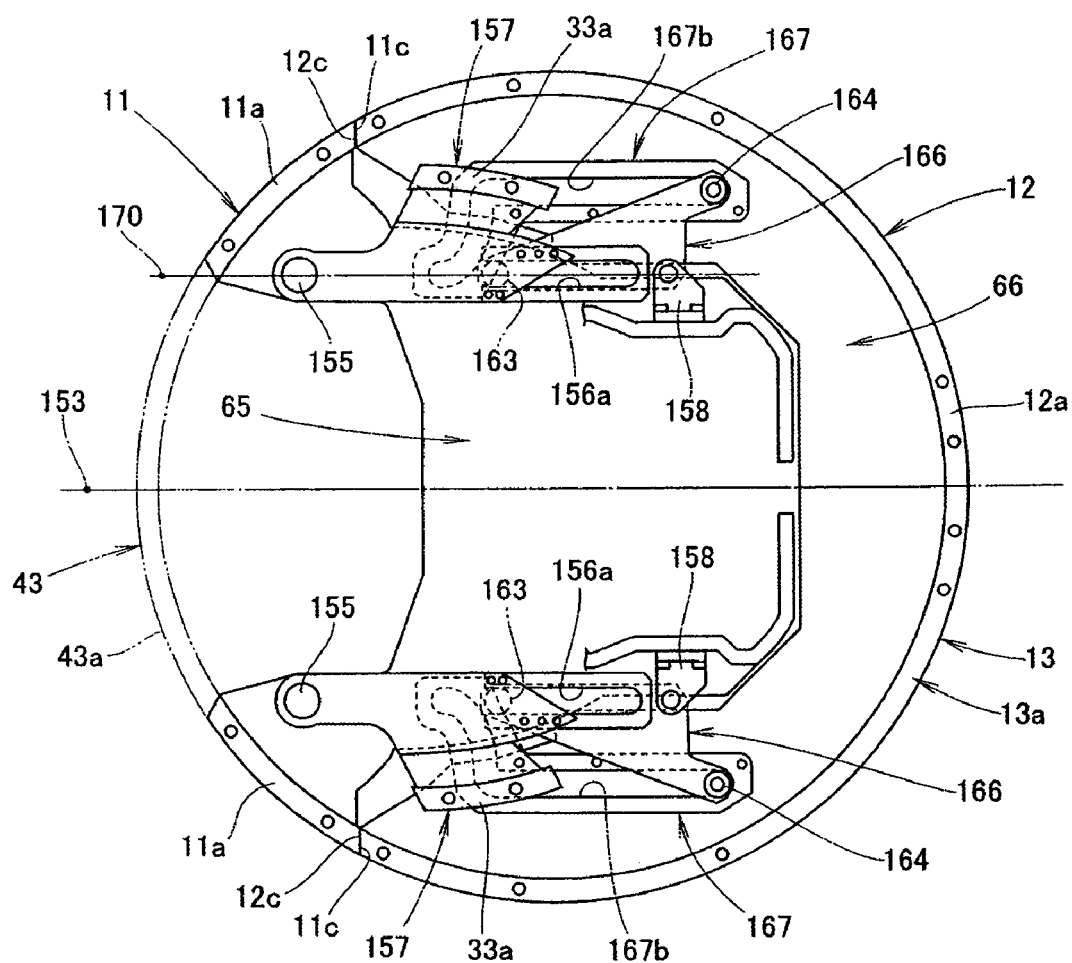
FIG. 11 is a first operation view illustrating the operation of the movable rail driving unit according to the exemplary embodiment of the invention.

FIG. 11 shows a first operation view of the operation of the movable rail driving unit according to the exemplary embodiment of the invention, and illustrates a state where the second main body 66 moves to approach the first main body 65, and thus the second stationary rail 12 is connected to the first stationary rail 11.

The axial centers of the first cam groove 156a of the extending and opening member 157 and the first shaft member 163 of the link plate 166 are disposed on the straight line 170. The second shaft member 164 of the link plate 166 is disposed at the end of the straight groove 167b of the second cam member 167.

Figure 12:
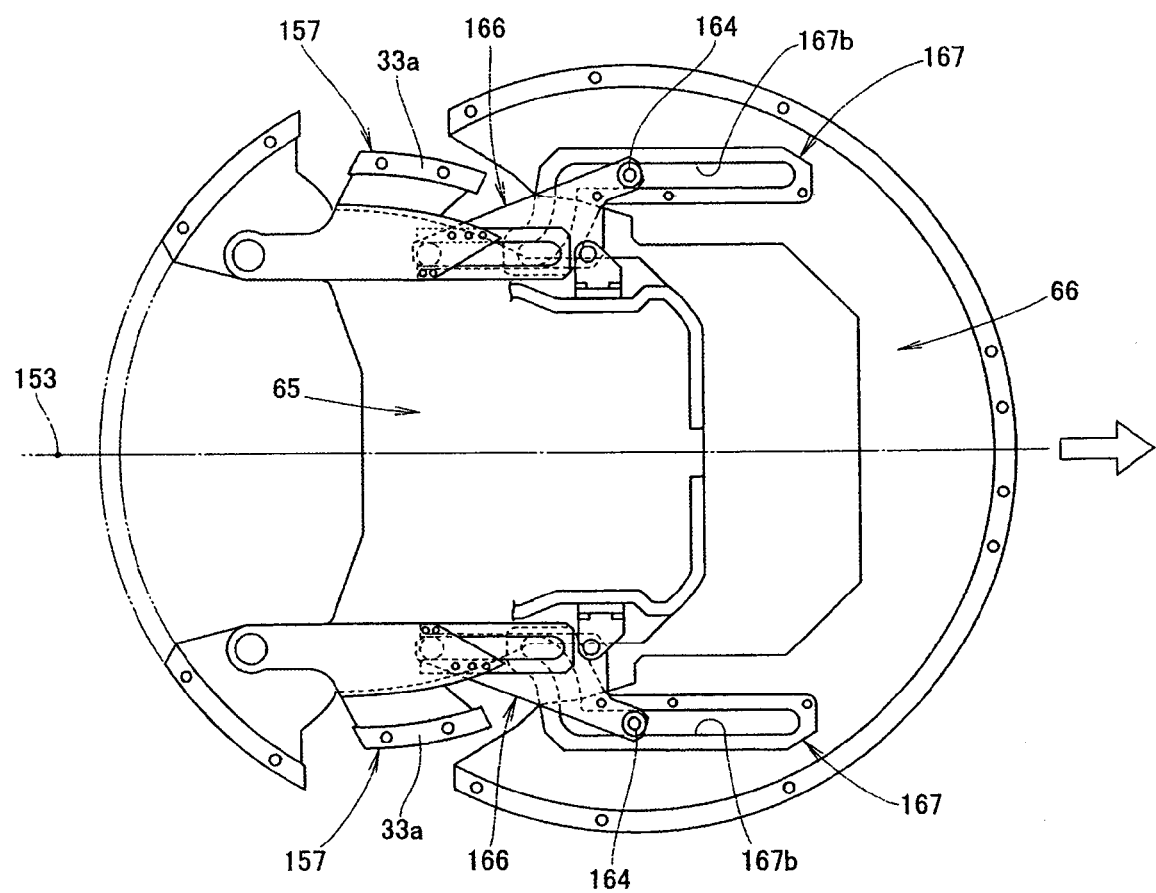
FIG. 12 is a second operation view illustrating the operation of the movable rail driving unit according to the exemplary embodiment of the invention.

FIG. 12 shows a second operation view of the operation of the movable rail driving unit according to the exemplary embodiment of the invention. When the second main body 66 begins to move from the first main body 65 in a direction of extending the centerline 153, i.e., in a direction of being separated from the first main body 65, the second shaft member 164 of the link plate 166 moves within the straight groove 167b parallel with the centerline 153 of the second cam member 167. Therefore, the link plate 166 and the extending and opening member 157 are stopped without swing.

Figure 13:
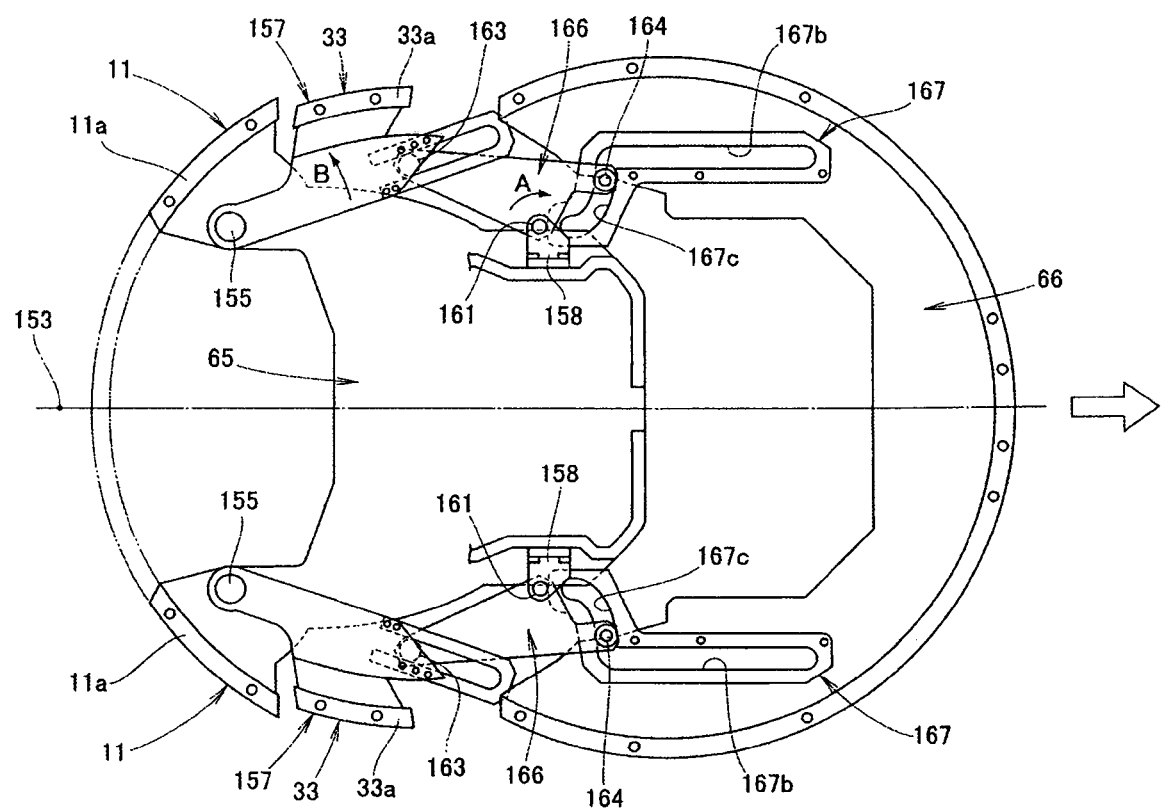
FIG. 13 is a third operation view illustrating the operation of the movable rail driving unit according to the exemplary embodiment of the invention.

FIG. 13 shows a third operation view of the operation of the movable rail driving unit according to the exemplary embodiment of the invention. When the second main body 66 continuously moves from the first main body 65 in a direction of extending the centerline 153, i.e., in a direction of being separated from the first main body 65, and the second shaft member 164 of the link plate 166 moves from the straight groove 167b of the second cam member 167 to the curved groove 167c, the second shaft member 164 approaches the centerline 153. Therefore, the swing plate 166 swings clockwise with respect to the supporting shaft 161 of the bracket member 158 as shown by an arrow A. As the first shaft member 163 of the swing plate 166 moves, the extending and opening member 157 swings counterclockwise with respect to the supporting shaft 155 as shown by an arrow B.

When the second main body 66 further moves to be separated from the first main body 65, the second shaft member 164 of the link plate 166 moves toward the end of the curved groove 167c. Accordingly, the link plate 166 further swings in the direction of the arrow A, and the extending and opening member 157 further swings in the direction of the arrow B (refer to FIG. 9). In other words, the movable rail 33 is connected to the first stationary rail 11.

Figure 14A:
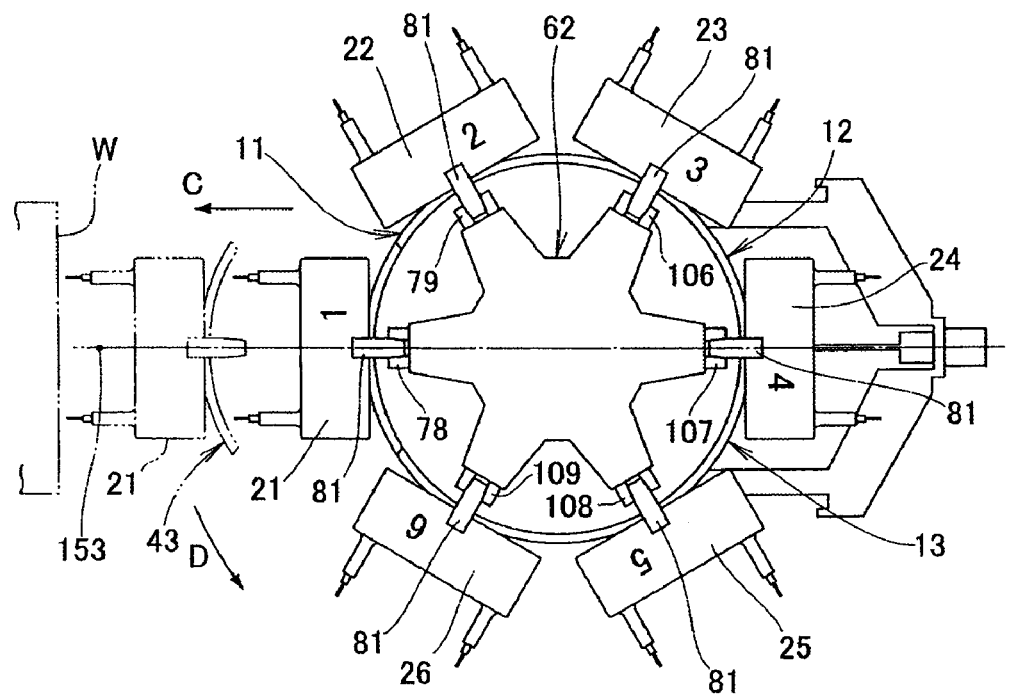
FIG. 14A is a first operation view illustrating the operation of the multi-spindle head exchangeable machine tool according to the exemplary embodiment of the invention.
Figure 14B:
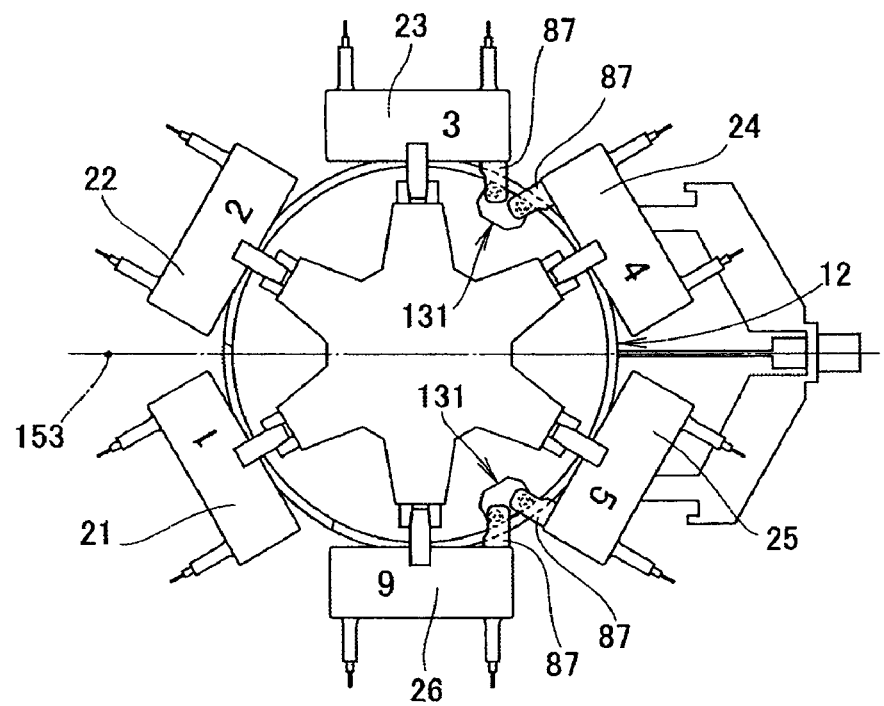
FIG. 14B illustrates a state where the multi-spindle head moved from a position of FIG. 14A.

The multi spindle heads 21 to 26 of the above-mentioned multi-spindle head exchangeable machine tool 10 are used and exchanged as follows. FIGS. 14A and 14B are first operation views illustrating the operation of the multi-spindle head exchangeable machine tool according to the exemplary embodiment of the invention. Referring to FIG. 14A, in the state where the first stationary rail 11 is connected with the second stationary rail 12, the multi spindle head 21 of the multi spindle heads 21 to 26 (for convenience, numerals of 1 to 6 are given thereto) is moved to the centerline 153 by the index unit 62, and then moved together with the machining unit frontward in the direction of an arrow C, thereby machining the workpiece W. After completing the machining of the workpiece W, the multi spindle head 21 goes back to an original position, and the multi spindle heads 21 to 26 are moved on the annular rail 13 counterclockwise as shown by an arrow D in order to allow at least one of the multi spindle heads 23 to 26 to be exchanged. At this time, the objective held pieces 81 of the multi spindle heads 21 to 26 are fixed by the locking members 78, 79, 106 to 109 of the index unit 62, respectively.

Referring to FIG. 14B, the multi spindle heads 21 to 26 are moved by a half of the angle between the adjacent multi spindle heads, i.e., by 30° with respect to the position shown in FIG. 14A. In this state, the multi spindle heads 23 and 24 are locked by one movement locking device 131 so as to prevent the multi spindle heads 23 to 26 disposed in the second stationary rail 12 from moving on the second stationary rail 12. Further, the multi spindle heads 25 and 26 are locked by the other movement locking device 131. With regard to the arms 87, only the part needed for the description has been shown and the other has been omitted.

Figure 15A:
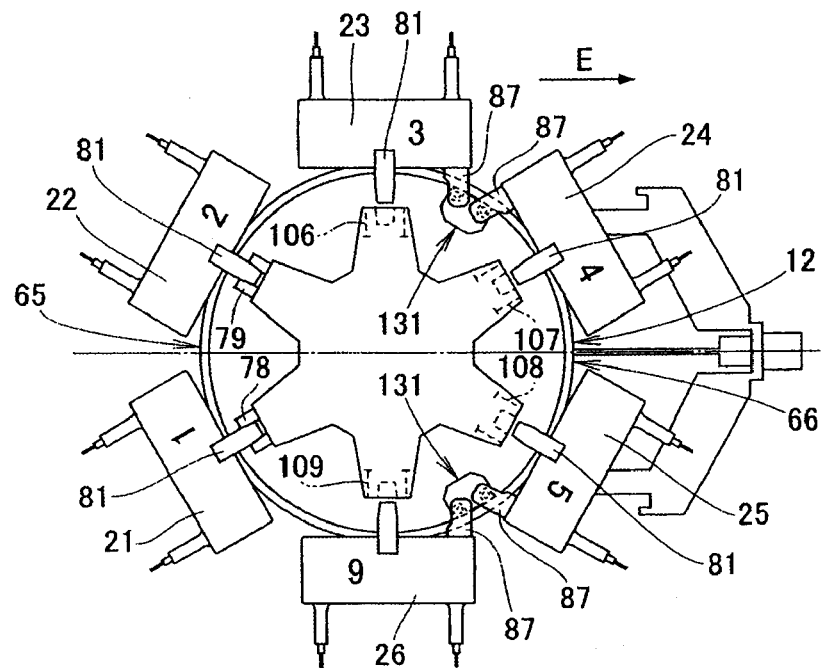
FIG. 15A is a second operation view illustrating the operation of the multi-spindle head exchangeable machine tool according to the exemplary embodiment of the invention.
Figure 15B:
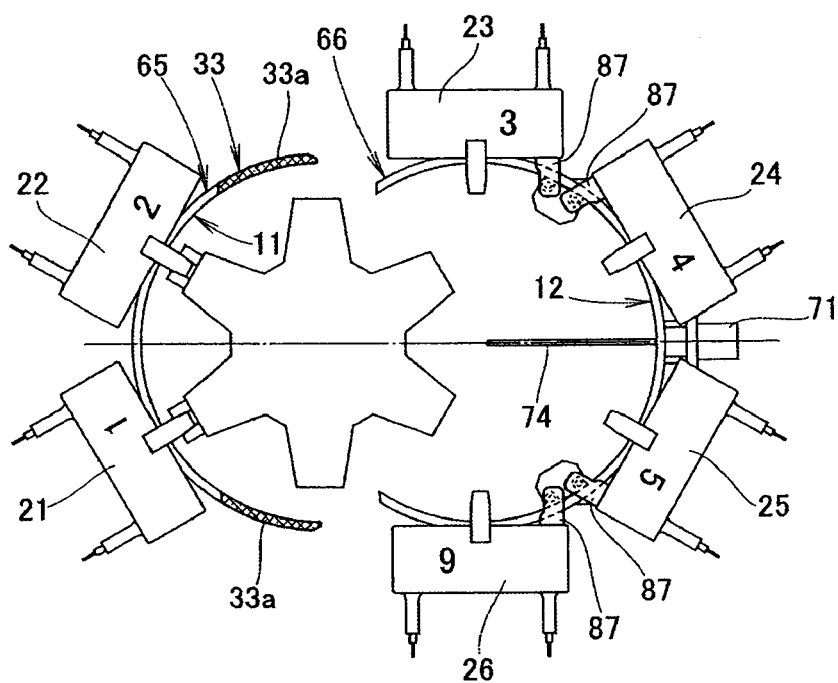
FIG. 15B illustrates a state where a second main body moved.

FIGS. 15A and 15B are second operation views illustrating the operation of the multi-spindle head exchangeable machine tool according to the exemplary embodiment of the invention. Referring to 15A, the holder 76 (refer to FIG. 6) is operated, and the objective held pieces 81 of the multi spindle heads 23 to 26 are released from the locking members 106 to 109. Meanwhile, the objective held pieces 81 of the locking members 78 and 79 and the multi spindle heads 21 and 22 are still in the locked state.

Here, even though the objective held pieces 81 are released, the multi spindle heads 23 to 26 are locked by the movement locking devices 131 and 131. Therefore, the multi spindle heads 23 to 26 does not move on the second stationary rail 12. Then, the second main body 66 is moved from the first main body 65 in the direction of an arrow E.

FIG. 15B shows the state after the second main body 66 is moved. As the second main body 66 moves, the movable rail 33 (refer to a cross-hatching part) accommodated in the first main body 65 is moved onto the extension line of the first stationary rail 11.

Figure 16A:
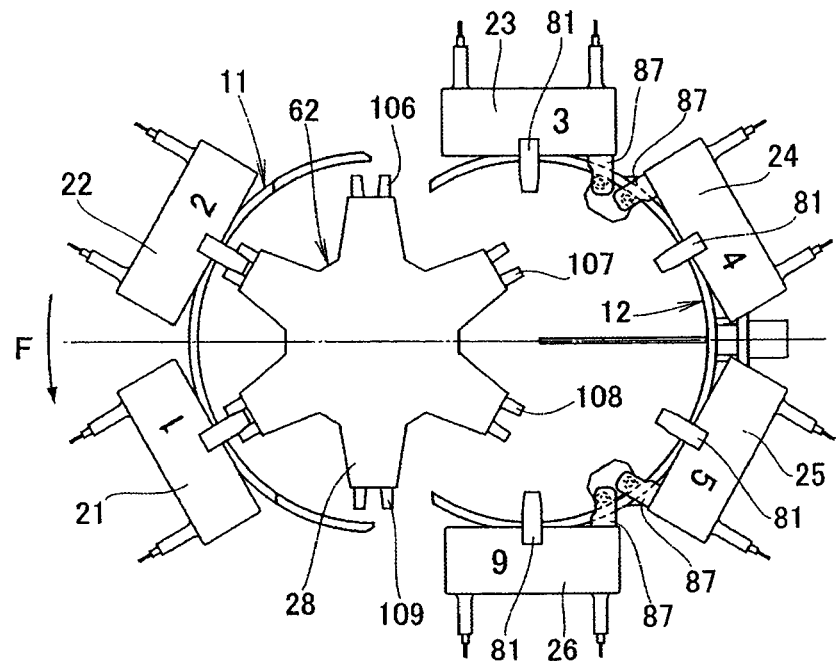
FIG. 16A is a third operation view illustrating the operation of the multi-spindle head exchangeable machine tool according to the exemplary embodiment of the invention.
Figure 16B:
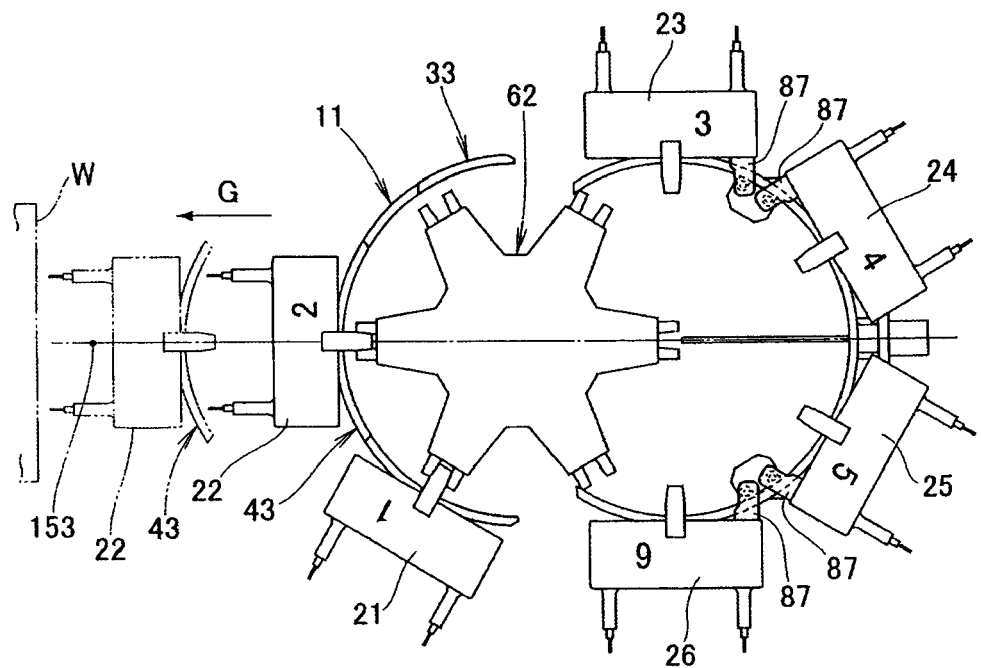
FIG. 16B illustrates a state where the multi-spindle head is advancing.

FIGS. 16A and 16B are third operation views illustrating the operation of the multi-spindle head exchangeable machine tool according to the exemplary embodiment of the invention. Referring to FIG. 16A, the holder 76 (refer to FIG. 6) is operated so that the locking members 106 to 109 protrude. If the locking members 106 to 109 do not protrude, an interlock device (i.e., an abnormal operation preventing device) is operated and thus the index unit 62 is not operated (i.e., the index table 28 does not rotate). For example, in the state that the first stationary rail 11 is connected with the second stationary rail 12, when the locking members 106 to 109 are not fixed to the objective held pieces 81 of the multi spindle heads 23 to 26 and the index table 28 rotates, the variation of the relative position between the index table 28 and the multi spindle heads 23 to 26 is prevented. That is, the index table 28 is allowed to rotate under the condition that the locking members 106 to 109 protrude. Then, the index unit 62 is operated to rotate the multi spindle heads 21 and 22 counterclockwise in the direction of an arrow F.

Referring to FIG. 16B, the multi spindle heads 22 is moved onto the centerline 153, and moved together with the machining unit from the centerline 153 forward in the direction of an arrow G, thereby machining the workpiece W. While the multi spindle head 22 machines the workpiece W, at least one of the multi spindle heads 23 to 26 is separated from the second stationary rail 12 and exchanged with a new multi spindle head, thereby exchanging the rotary tool.

When the workpiece W is completely machined by the multi spindle head 22, the multi spindle head 22 goes back to the original position. Then, the multi spindle head 21 is moved onto the centerline 153, and the multi spindle head 21 can be used in machining the workpiece W as described above, or return to FIG. 14A after passing through the processes of FIGS. 16A, 15B, 15A and 14B in sequence. Thus, while the machining is performed between the multi spindle heads 21 and 22 remained in the first main body 65, the other multi spindle heads disposed on the second stationary rail 12 of the second main body 66 can be exchanged, thereby exchanging the rotary tool.

Figure 17:
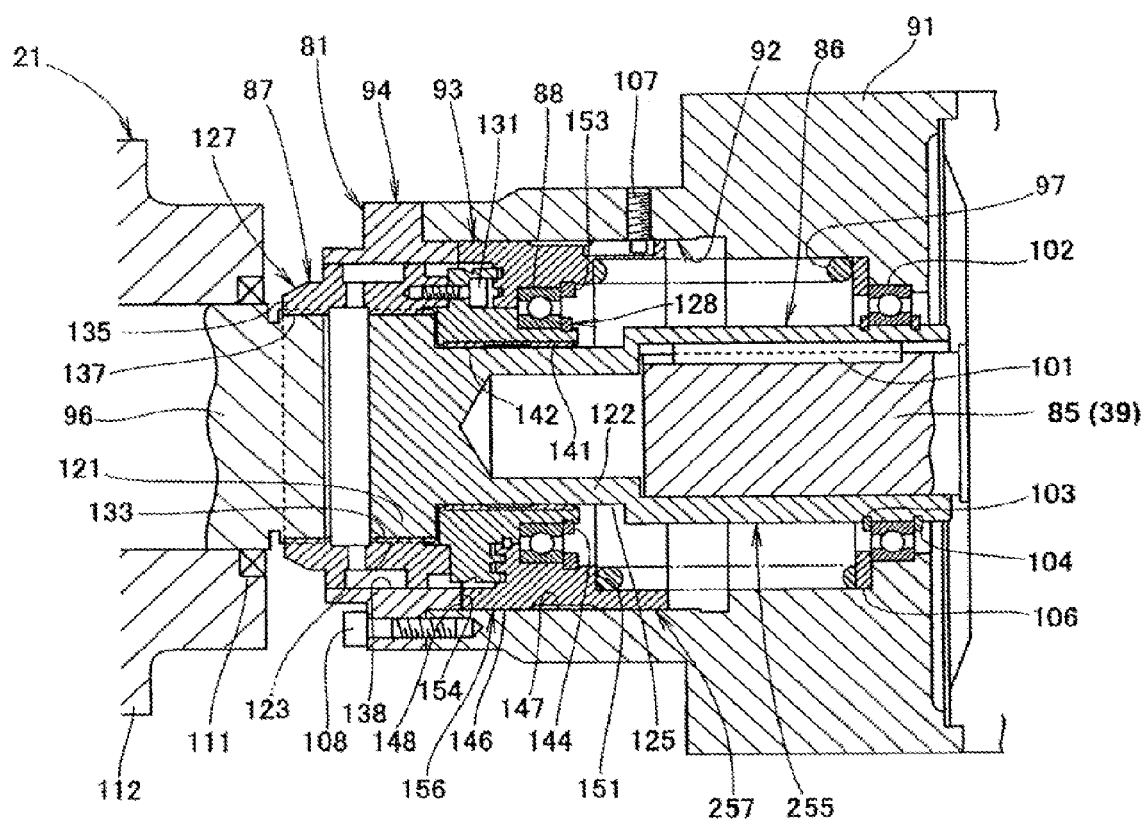
FIG. 17 is a cross sectional view illustrating a driving force transmitting device according to the exemplary embodiment of the invention.

FIG. 17 is a cross-sectional view illustrating the driving force transmission mechanism according to the exemplary embodiment of the invention, and the driving force transmission mechanism 81 includes a rotary shaft extending part 86 integrally connected with the end of the rotary shaft 85 of the driving source 39 (refer to FIG. 3); an inner slider 87 that is connected to the outer peripheral end of the rotary shaft extending part 86 and movable in the axial direction of the rotary shaft 85; ball bearings 88 fitted to the outer periphery of the inner slider 87; an outer slider 93 that is fitted to the outer peripheral surface of the ball bearings 88 and movably inserted in an opening 92 formed in the end of a housing 91 for accommodating the main body of the driving source 39; a stopper member 94 mounted to the housing 91 having the opening 92 so as to accommodate one end of the outer slider 93; and a coil spring 97 that is interposed between the other end of the outer slider 93 and the end of the opening 92 so as to press the outer slider 93 toward the input shaft 96 provided in the multi spindle head 21.

Here, reference numeral 101 indicates a key that rotates the rotary shaft 85 and the rotary shaft extending part 86 as one unit; reference numeral 102 indicates bearings interposed between the housing 91 and the rotary shaft 85 to support the rotary shaft 85 rotatably; reference numerals 103 and 104 indicate retaining rings for retaining the bearings 102; reference numeral 106 indicates a washer for supporting one end of the coil spring 97; reference numeral 107 indicates a bolt member that prevents the outer slider 87 from rotating within the opening 92 of the housing 91 and limits the moving range of the outer slider 87 in the axial direction; reference numeral 108 indicates a bolt for fixing the stopper member 94 to the housing 91; and reference numeral 111 indicates a sealing member for sealing a gap between the housing 12 of the multi spindle head 21 and the input shaft 96.

The rotary shaft extending part 86 includes a large caliber part 121 provided at the end thereof, and a small caliber part 122 mounted to the rotary shaft 85 of the large caliber part 121. The outer periphery of the large caliber part 121 is formed with a male-spline 123. In addition, reference numeral 123 indicates the outer periphery of the small caliber part 122.

The inner slider 87 includes a first cylinder 127 to be spline-combined with the large caliber part 121 of the rotary shaft extending part 86, and a second cylinder 128 slidably fitted to the small caliber part 122 of the rotary shaft extending part 86 in the axial direction of the rotary shaft 85. The first and second cylinders 127 and 128 are combined by means of a plurality of bolts 131 (only one bolt 131 is shown). Further, the second cylinder member 128 is divided into two parts along the circumferential direction, and coupled by a plurality of bolts (not shown).

The first cylinder 127 is internally formed with a female-spline 133 to be spline-combined with the male-spline 123 of the large caliber 121, and is formed with a female-spline 137 at an end thereof to be spline-combined with the mail-spline 135 formed on the outer periphery of the input shaft 96. Further, the outer periphery of the first cylinder 127 is slidably fitted to the inner periphery 138 of the stopper member 94.

The second cylinder 128 has an inner periphery 141 formed with a push 142 that slides on the outer periphery 125 of the small caliber 122, and an outer periphery to which the ball bearings 88 are fitted. Meanwhile, reference numeral 144 indicates a retaining ring for preventing the breakaway of the ball bearings 88.

The outer slider 93 has an inner periphery to which the ball bearings 88 are fitted, and an outer periphery 146 slidably fitted to the inner periphery 147 of the opening 92. Further, the outer slider 93 includes one end having a contact surface 148 coming in contact with the stopper member 94, and the other end having a spring accommodating surface 151 for accommodating one end of the coil spring 97. In addition, reference numeral 153 indicates a retaining ring for preventing the breakaway of the ball bearings 88, and reference numeral 154 indicates a stopper surface provided in the stopper member 94 to come in contact with the contact surface 148 of the outer slider 93.

The above-mentioned rotary shaft 85 and the rotary shaft extending part 86 form the output shaft 255 of the driving source 39. Further, the inner slider 87, the ball bearings 88, the outer slider 93 and the coil spring 97 of the driving force transmission mechanism are used in forming the connecting device 256 that slide on the output shaft 255 and the housing 91 except the coil spring 97 as one unit to connect the input shaft 96 with the output shaft 255.

Further, the connecting device 256 except the coil spring 97, i.e., the inner slider 87, the ball bearings 88 and the outer slider 93 form the sliding part 257.

Figure 18:
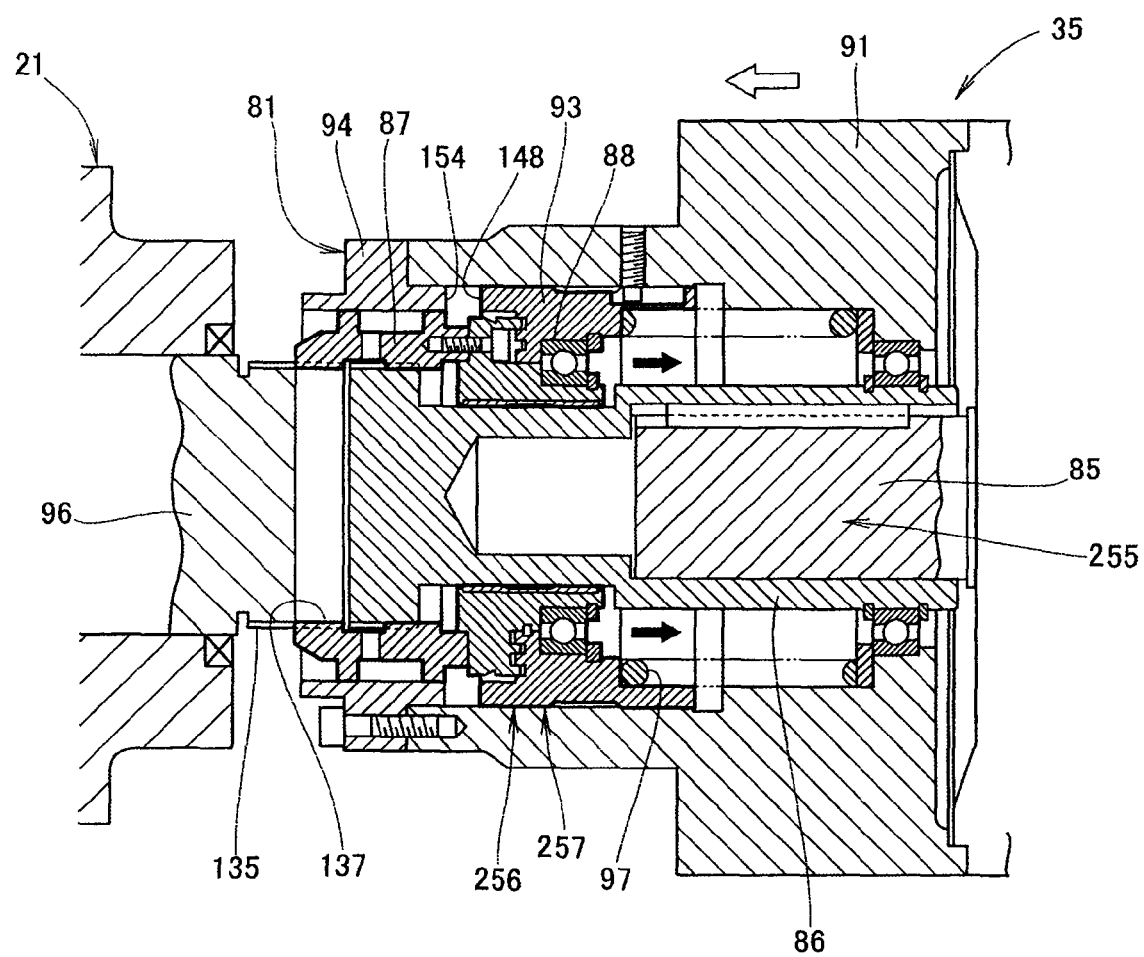
FIG. 18 is an operation view of a connection device according to the exemplary embodiment of the invention.
Figure 19:
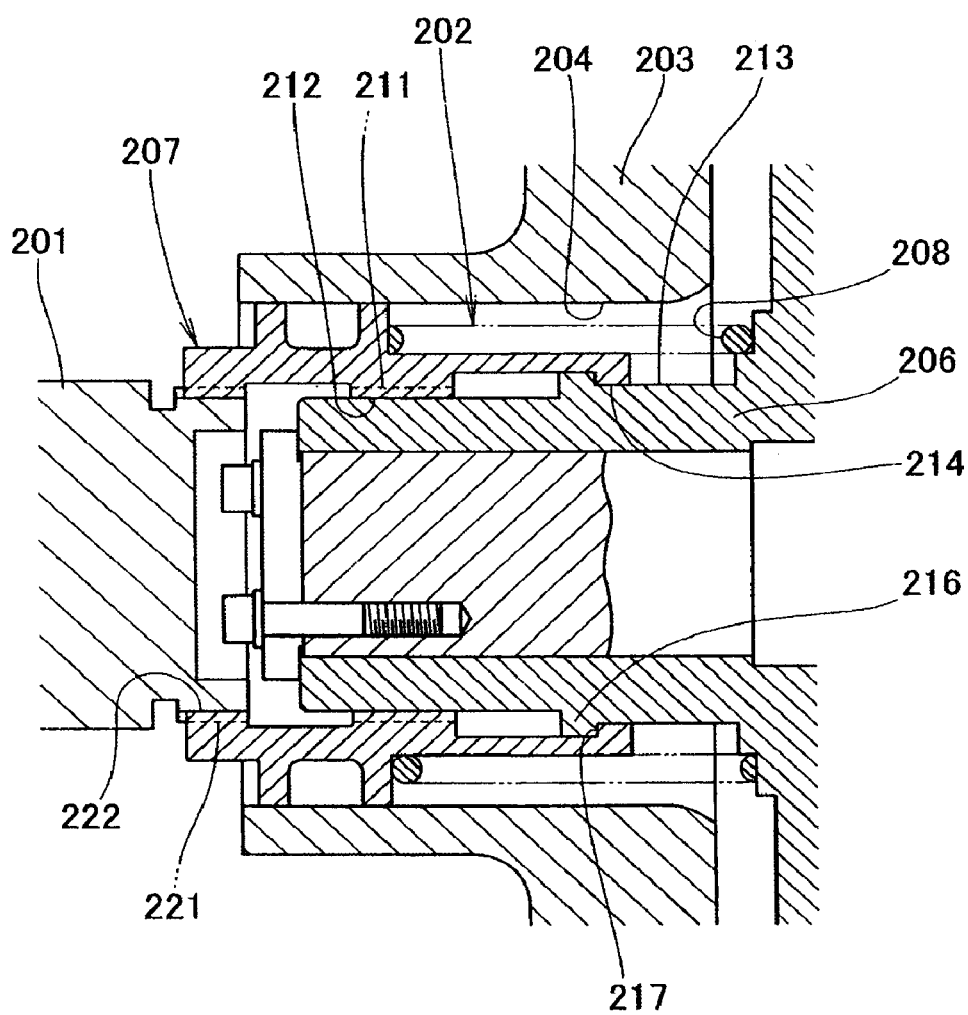
FIG. 19 is a cross sectional view illustrating a connecting structure of an input shaft and an output shaft of a related art of the invention.

Then, the operation of the above-mentioned connecting device 256 will be described. FIG. 18 shows the operation of the connecting device according to the exemplary embodiment of the invention. FIG. 5 shows the following state. In the state, the connecting device 256 of the machining unit 35 is not connected to the input shaft 96 (for understanding of the shape, the cross-section of the sliding part 257 of the connecting device 156 is represented with a bold line). Further, when the machining unit 35 moves forward as shown in the white arrow and the inner slider 87 is spline-combined with the input shaft 96 by pushing the end of the inner slider 87 against the end of the input shaft 96, the male-spline 135 of the input shaft 96 is not engaged with the female-spline 137 of the inner slider 87, whereby the spline coupling is not performed.

In the connecting device 256, the end of the inner slider 87 comes in contact with the end of the input shaft 96, and goes back in the direction of the black arrow with regard to the output shaft 155 and the housing 91 as shown in FIGS. 17 and 18. Further, the coil spring 97 is in a compressed state.

In this state, when the male-spline 135 of the input shaft 96 and the female-spline 137 of the inner slider 87 begin to be engaged with each other, the sliding part 257 of the connecting device 256 rapidly moves toward the input shaft 96 by the elasticity of the coil spring 97 and thus the contact surface 148 of the outer slider 93 collides with the stopper surface 154 of the stopper member 94 (refer to FIG. 17). At this time, since the impact of the collision is absorbed in the ball bearings 88 provided between the outer slider 93 and the inner slider 87, little impact is transferred to the output shaft 255.

As shown in FIGS. 1, 3, and 4, first, a multi-spindle head exchangeable machine tool 10 includes a main body 61, an annular rail 13 surrounding the main body 61, a plurality of multi spindle heads 21 to 26 movably mounted onto the annular rail 13, a machining unit 35 that can be connected to or separated from one (for example, the multi spindle head 21) of the multi spindle heads 21 to 26 and drives rotary tools 36 to 38 provided in the multi spindle heads. The plurality of multi spindle heads 23 to 26 being out of use is detachable from the machining unit 35 when the machining unit 35 drives the tools 36 to 38 to machine a workpiece W (refer to FIG. 16B). Here, the main body 61 includes a first main body 65 including the machining unit 35, and a second main body 66 being movable against the first main body 65 by the driving source provided in the first main body 65. Further, the annular rail 13 can be divided into a first stationary rail 11 mounted to the first main body 65, and a second stationary rail 12 mounted to the second main body 66.

The multi spindle heads 21 and 22 being in use are remained in the first stationary rail 11, and the spindle heads 23 to 26 being out of use are moved onto the second stationary rail 12. For this reason, it is possible to perform maintenance such as the tool exchange or the like of the multi spindle heads 23 to 26 suspended on the second stationary rail 12 regardless of the use of the multi spindle heads 21 and 22 suspended on the first stationary rail 11. Therefore, the multi spindle heads 23 to 26 can be exchanged without stopping the whole equipment, and the operating ratio is improved, thereby enhancing productivity.

Second, as shown in FIGS. 4, 7, 8A and 8B, the movement locking device 131 is provided around the second stationary rail 12 of the second main body 66 as a multi-spindle head locking unit for locking the inner side roller members 133 and 133 of the suspension mechanism 130 that movably suspends the multi spindle heads 23 to 26. When the first main body 65 and the second main body 66 are moved relative to each other, the movement locking device 131 is operated to lock the movement of the multi spindle heads 23 to 26. Further, the multi spindle heads 23 to 26 are locked by the movement locking device 131 while the second stationary rail 12 is moved, so that the multi spindle heads 23 to 26 can be stopped at a predetermined position.

Third, in the movement locking device 131 for locking the movement of traveling bodies such as the multi spindle heads 21 to 26, which are suspended by the movable annular rail 13 and movable along the annular rail 13, the inner side roller member 133 of the suspension mechanism 130 suspending the multi spindle heads 23 to 26 is locked when the annular rail 13, and more particularly, the second rail 12 is moved. Thus, the inner side roller member 133 of the suspension mechanism 131 is locked by the movement locking device 131, and the multi spindle heads 23 to 26 do not move and are stopped at a predetermined position.

Further, in the above described exemplary embodiment of the invention, the multi spindle lock means is provided to lock the roller of the suspension mechanism, and as shown in FIG. 7, the inner side roller member 133 is locked. But the invention is not limited thereto. Alternatively, the upper roller member 135 or the outer side roller member may be locked.

As shown in FIGS. 1, 3, and 4, forth, the multi-spindle head exchangeable machine tool 10 includes the main body 61 having the rotary driving source 31 as the index driving source; the annular rail 13 (refer to FIG. 11) surrounding the main body 61; the plurality of multi spindle heads 21 to 26 that is movably mounted to the annular rail 13 and fixed to the index table 28 driven by the rotary driving source 31; and the machining unit 35 that is detachably connected to the multi spindle head 21 so as to drive the plurality of rotary tools 36 to 38 provided in one multi spindle head 21 of the multi spindle heads 21 to 26. Here, the main body 61 includes the first main body 65 and the second main body 66 movable relatively to the first main body 65 by the rotary driving source 71 provided in the first main body 65. Further, the annular rail 13 includes the first stationary rail 11 mounted to the first main body 65, the second stationary rail 12 mounted to the second main body 66, and the third stationary rail 43 mounted to the machining unit 35. Further, the plurality of locking members 78, 79, 106 to 109 is provided in the index table 28 and connected to or separated from the multi spindle heads 21 to 26. Further, there are the locking member operating mechanism 115 (refer to FIG. 6) that includes a cam device 111 (refer to FIG. 6) for allowing the index table 28 to be rotatably mounted on the first main body 65, and for allowing the locking members 106 to 109 among the plurality of locking members 78, 79, 106 to 109 to be coupled to and separated from the multi spindle head 23 to 26. The first stationary rail 11 and the third stationary rail 43 are separated from the second stationary rail 12, so that the multi spindle heads 21 and 22 are remained in the first and third stationary rails 11 and 43. Then, one of the multi spindle heads 21 and 22 is moved to a predetermined machining position by the index table 28.

The annular rail 13 includes the first stationary rail 11 mounted to the first main body 65, the second stationary rail 12 mounted to the second main body 66, and the third stationary rail 43 mounted to the machining unit 35, which are detachably connected with each other. The plurality of locking members 78, 79, 106 to 109 is provided in the index table 28 and connected to and separated from each of the multi spindle heads 23 to 26. The index table 28 is rotatably mounted on the top of the first main body 65. Further, the locking member operating mechanism 115 includes a cam device 111 for making some of locking members be connected to or separated from the multi spindle heads 23 to 26 at the same time. Therefore, when the first main body and the second main body are relatively moved and the first stationary rail 11 is separated from the second stationary rail 12, some multi spindle heads 21 and 22 are remained on the first stationary rail 11 and the third stationary rail 43 and the total weight of the multi spindle heads 21 and 22 decreases, thereby enhancing the moving speed of the multi spindle heads 21 and 22. Thus, it is possible to reduce the time taken in setting the multi spindle heads 21 and 22 at predetermined positions, and to reduce the cycle time, thereby improving productivity.

Fifth, as shown in FIGS. 4 and 9, a first cam member 156 is provided in the annular rail 13 of the first main body 65. The first cam member 156 has one end movably mounted to a supporting shaft 155 and the other end formed with a first cam groove 156a. An extending and opening member 157 is provided with a movable rail 33 in the outside thereof. A bracket member 158 is provided around the center of the first main body 65. A substantially triangular link plate 166 has one vertex 166a to be movably mounted to the bracket member 158, and the other two vertexes 166b and 166c connected with first and second shaft members 163 and 164. In this case, the first shaft member is movably inserted in the first cam groove 156a of the extending and opening member 157. A substantially L-shaped second cam groove 167a is formed inside the annular rail 13 of the second main body 66, and includes a straight groove 167b extending in a relative moving direction of the first and second main bodies 65 and 66, and a curved groove 167c curved toward the center of the second main body 66 and moving from the straight groove 167b to the bracket member 158. Further, in a second cam member 167, the second shaft member 164 is movably inserted in the second cam groove 167a. When the first main body 65 and the second main body 66 are moved close to each other and the first stationary rail 11 and the second stationary rail 12 are connected with each other, the second shaft member 164 is positioned in the straight groove 167b of the second cam member 167, so that the movable rail 33 is positioned in the first main body 65. On the other hand, when the first main body 65 and the second main body 66 are moved apart from each other and the first stationary rail 11 and the second stationary rail 12 are separated from each other, the second shaft member 164 is moved to the inside of the curved groove 167c of the second cam member 167, so that the first shaft member 163 swings outward with respect to the bracket member 158 and swings outward to extend and opened with respect to the supporting shaft 155. Thus, the movable rail moves along an extension line of the first stationary rail 11.

Even though the first stationary rail 11 and the second stationary rail 12 are separated from each other, a movable range of the multi spindle head 21 and 22 in the first stationary rail 11 can be ensured because the movable rail 33 is provided on the extension line of the first stationary rail 11.

Sixth, the extending and opening member 157 is provided inside the annular rail 12 of the first main body 65. The extending and opening member 157 has one end movably mounted to the supporting shaft 155, and has a movable rail 33 in the outside thereof. When the first main body 65 and the second main body 66 are moved close to each other and the first stationary rail 11 and the second stationary rail 12 are connected with each other, the movable rail 33 is accommodated in the first main body 65. On the other hand, when the first main body 65 and the second main body 66 are relatively moved and separated from each other, the movable rail 33 moves to the extension line of the first stationary rail 11. The movable rail 33 is moved by swing the extending and opening member 157 on the basis of the relative movement between the first main body 65 and the second main body 66 due to the driving source.

The movable rail 33 is moved by the relative movement between the first main body 65 and the second main body 66, so that there is not needed a separate power source for moving the movable rail 33. That is, the driving source provided in the first main body 65 is enough to move the movable rail, so that it is possible to achieve a simple and lightweight device.

In the above described exemplary embodiment, as shown in FIG. 4, six multi spindle heads 21 to 26 are suspended on the annular rail 13, but the invention is not limited thereto. Alternatively, three to five or more multi spindle heads may be suspended on the annular rail 13.

As shown in FIGS. 1, 3, and 17, the multi-spindle head exchangeable machine tool 10 includes the main body 61 having the rotary driving source 36 to 38 for driving the rotary tool, the multi spindle heads 21 to 26 that can be coupled to and separated from the main body 61 and have the rotary tool, the output shaft 255 provided in the rotary driving source 36 to 38, the input shaft 96 transmitting a power to the rotary tool. In this case, the output shaft 255 and the input shaft 96 are connected by means of the connecting device 256. Here, the connecting device 156 includes an inner slider 87 having one end spline-combined with the input shaft 96, a middle part spline-combined with a large caliber part 121 provided in the output shaft 255, and the other end sliding on a small caliber part 122 having a smaller diameter than the large caliber part 121 in a shaft direction of the output shaft 255; bearings fitted in the outer periphery of the inner slider 87; an outer slider 93 fitted in the outer periphery of the bearings 88 and sliding in the shaft direction of the output shaft 255 on the inner periphery of the opening formed in the main body 61 to accommodate the output shaft 255; and an elastic member interposed between the outer slider 93 and one end of the opening 92 so as to press the outer slider 93 against the other end of the opening installed in the input shaft. Here, the coil spring 97 can be used as the elastic member.

The coil spring 97 is provided between the outer slider 93 and the other end of the opening 92, i.e., the coil spring 97 is disposed in the main body 61 having no effect on the rotation of the output shaft 155, so that there is no limitation caused by the conventional elastic member provided in the rotary shaft in the rotational speed of the output shaft 255. Therefore, the rotary tools 36 to 38 of the multi spindle heads 21 to 26 can be rotated at high speed, and the workpiece can be machined under a high speed cutting condition, thereby enhancing productivity.

Further, the bearings 88 interposed between the inner slider 87 and the outer slider 93 can buffer the impact generated when the input shaft 96 and the inner slider 87 are spline-combined with each other. Therefore, the operation of the driving source is not effected by the impact, and there is not needed a specific rotary driving source having high impact resistance. Thus, it is possible to use a marketing standard motor, thereby reducing production cost.

Also, in the above described exemplary embodiment, as shown in FIG. 17, the output shaft 255 includes the rotary shaft 85 and the separate rotation extending part 86 mounted to the rotary shaft 85, but the invention is not limited thereto. Alternatively, the rotary shaft 85 and the rotation extending part 86 may be formed as a single body.

It will be apparent to those skilled in the art that various modifications and variations can be made to the described exemplary embodiments of the present invention without departing from the spirit or scope of the invention. Thus, it is intended that the present invention coverall modifications and variations of this invention consistent with the scope of the appended claims and their equivalents.

The present application claims foreign priority based on Japanese Patent Application Nos. P.2005-115816 filed on Apr. 13, 2005, P.2005-115833 filed on Apr. 13, 2005, and P.2005-115884 filed on Apr. 13, 2005, the contents of them are incorporated herein by reference.

INDUSTRIAL APPLICABILITY

A multi-spindle head exchangeable machine tool according to the invention is adapted to a divided annular rail of moving the multi spindle heads.

Moreover, a multi-spindle head exchangeable machine tool according to the invention is adapted to connect an input shaft of transferring a driving force to tools provided in a multi spindle head with an output shaft provided in a tool driving source.

The invention claimed is:

1. A multi-spindle head exchangeable machine tool, comprising:
an overall main body;
an annular rail surrounding the overall main body;
a plurality of multi spindle heads movably mounted on the annular rail; and
a machining unit that is connected to one of the multi spindle heads and is operable to drive tools on the one multi spindle head, wherein others of the multi spindle heads are out of use;
wherein the overall main body includes:
a first main body including the machining unit; and
a second main body being movable from the first main body by a driving source on the first main body, wherein the second main body is disposed such that the machining unit is disposed between the second main body and the one multi spindle head connected to the machining unit,
the annular rail is dividable into:
a first stationary rail mounted on the first main body; and
a second stationary rail mounted on the second main body, the first stationary rail and the second stationary rail cooperating to encircle the overall main body,
when the machining unit drives the tools on the one multi spindle head to machine a workpiece, the multi spindle heads being out of use are detached from the machining unit,
wherein the second main body includes a multi-spindle head locking unit, which is disposed in the vicinity of the second stationary rail and locks rollers of a suspension mechanism for movably suspending the multi spindle heads, and
the multi-spindle head locking unit is operated to lock a movement of the multi spindle heads when the first main body and the second main body are moved relatively toward or away from each other and to permit movement of the multi spindle heads when the first main body and the second main body are stationary with respect to one another.

2. The multi-spindle head exchangeable machine tool according to claim 1, wherein the overall main body has an index driving source,
the plurality of multi spindle heads are connected to an index table driven by the index driving source,
the annular rail is dividable into the first stationary rail, the second stationary rail, and a third stationary rail mounted on the machining unit,
the index table includes a plurality of locking members, which are connected to and separated from the multi spindle heads, respectively,
the index table is rotatably mounted on the first main body, the first main body includes a locking member operating means that includes a cam device to simultaneously make some of the locking members be connected to or separated from, respectively, the multi spindle heads, and
some multi spindle heads are remained on the first and third stationary rails by separating the first and third stationary rails from the second stationary rail, and one of the multi spindle heads is moved to a machining position by the index table.

3. The multi-spindle head exchangeable machine tool according to claim 2,
wherein the first main body includes, inside the annular rail:
an extending and opening member that has one end swingably mounted on a supporting shaft and the other end having a first cam member formed with a first cam groove, the extending and opening member being provided with a movable rail;
a bracket member provided to the first main body; and
a link plate, which has a substantially triangular shape with one vertex to be swingably mounted to the bracket member and the other two vertexes to be connected with a respective shaft member, designated first and second shaft members, and wherein the first shaft member is movably inserted in the first cam groove of the extending and opening member,
the second main body includes, inside the annular rail, a second cam member formed with a substantially L-shaped second cam groove, which has a straight groove portion extending in a relative moving direction of the first and second main bodies and a curved groove portion curved from the straight groove portion toward the center of the second main body so as to extend from the straight groove portion to the bracket member, and wherein the second shaft member is movably inserted in the second cam groove,
when the first main body and the second main body are moved close to each other and the first stationary rail and the second stationary rail are connected with each other, the second shaft member is located in the straight groove portion of the second cam member, and thus the movable rail is placed inside the first main body, and
when the first main body and the second main body are moved apart from each other and the first stationary rail and the second stationary rail are separated from each other, the second shaft member is moved to the inside of the curved groove of the second cam member, and the first shaft member swings with respect to the bracket member and the first cam member swings with respect to the supporting shaft so that the movable rail moves to a position such that the movable rail extends along an extension line of the first stationary rail.

4. The multi-spindle head exchangeable machine tool according to claim 2,
wherein the first main body includes, inside the annular rail, an extending and opening member having one end swingably mounted to a supporting shaft and provided with a movable rail;
when the first main body and the second main body are moved close to each other and the first stationary rail and the second stationary rail are connected with each other, the movable rail is accommodated inside the first main body,
when the first main body and the second main body are moved apart from each other and the first stationary rail and the second stationary rail are separated from each other, the movable rail moves to a position such that the movable rail extends along an extension line of the first stationary rail, and
the movable rail is moved by swinging the extending and opening member on the basis of relative movement between the first and second main bodies.

5. The multi-spindle head exchangeable machine tool according to claim 1, wherein the overall main body has an index driving source;
the plurality of multi spindle heads are connected to an index table driven by the index driving source,
the annular rail is dividable into the first stationary rail, the second stationary rail, and a third stationary rail mounted on the machining unit,
the index table includes a plurality of locking members, which are connected to and separated from the multi spindle heads, respectively,
when the machining unit drives the tools to machine a workpiece, by dividing the first and third stationary rails from the second stationary rail, the multi spindle heads not used for machining in the plurality of multi spindle heads are capable of being divided from the first and third stationary rails and separated from the index table.

6. The multi-spindle head exchangeable machine tool according to claim 1, further comprising:
a movable rail accommodated in the first main body, and when the second main body moves from the first main body, the movable rail is configured to move onto an extension line of the first stationary rail and to be connected to the first stationary rail.

7. A multi-spindle head exchangeable machine tool comprising:
a main body;
an annular rail surrounding the main body;
a plurality of multi spindle heads movably mounted on the annular rail; and
a machining unit that is connected to one of the multi spindle heads and is operable to drive tools on the one multi spindle head, wherein others of the multi spindle heads are out of use,
wherein the main body includes:
a first main body including the machining unit; and
a second main body being movable from the first main body by a driving source on the first main body,
the annular rail is dividable into:
a first stationary rail mounted on the first main body; and
a second stationary rail mounted on the second main body,
when the machining unit drives the tools on the one multi spindle head to machine a workpiece, multi spindle heads of the plurality of multi spindle heads being out of use are detached from the machining unit.

8. The multi-spindle head exchangeable machine tool according to claim 7, further comprising:
a movable rail accommodated in the first main body, and when the second main body moves from the first main body, the movable rail is configured to move onto an extension line of the first stationary rail and to be connected to the first stationary rail.

* * * * *